US012083937B1

United States Patent
Norton

(10) Patent No.: US 12,083,937 B1
(45) Date of Patent: Sep. 10, 2024

(54) SAFETY STRUCTURE WITH ENERGY ABSORBER(S) AND MOTION CONTROL ASSEMBLY FOR REARWARD-FACING OCCUPANT

(71) Applicant: Zoox, Inc., Foster City, CA (US)

(72) Inventor: Thomas William Norton, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 626 days.

(21) Appl. No.: 17/244,383

(22) Filed: Apr. 29, 2021

(51) Int. Cl.
*B60N 2/427* (2006.01)
*B60N 2/42* (2006.01)

(52) U.S. Cl.
CPC ....... *B60N 2/42709* (2013.01); *B60N 2/4214* (2013.01); *B60N 2/4242* (2013.01)

(58) Field of Classification Search
CPC .......... B60N 2/42709; B60N 2/4242; B60N 2/4214; B60N 2/42781; B60N 2/4279; B60N 2/4263; B60N 2/4207; B60N 2/0276; B60N 2/42772; B60N 2/42736
USPC ....... 296/187.03, 68.1, 64, 65.02; 297/216.2, 297/216.13, 216.14, 216.15, 216.16, 297/216.17, 216.19
See application file for complete search history.

(56) References Cited

U.S. PATENT DOCUMENTS

| | | | | | |
|---|---|---|---|---|---|
| 3,452,834 | A | * | 7/1969 | Gaut | B60N 2/4221 296/68.1 |
| 5,152,578 | A | * | 10/1992 | Kiguchi | B60N 2/42736 188/371 |
| 5,632,521 | A | * | 5/1997 | Archambault | A61G 3/00 296/68.1 |
| 6,378,939 | B1 | * | 4/2002 | Knoll | B64D 11/0619 188/374 |
| 6,394,393 | B1 | * | 5/2002 | Mort | B64D 11/06 297/216.17 |
| 6,637,816 | B2 | * | 10/2003 | Pavlov | B60N 2/42736 297/216.19 |
| 8,033,602 | B2 | * | 10/2011 | Yamaki | B60N 2/4249 297/216.13 |
| 8,162,374 | B2 | * | 4/2012 | Cantor | B60N 2/24 296/68.1 |
| 10,150,392 | B2 | * | 12/2018 | Mani | B60N 3/066 |
| 2019/0387341 | A1 | * | 12/2019 | Lyren | G10L 19/22 |
| 2020/0079254 | A1 | * | 3/2020 | Mori | B60R 22/34 |
| 2020/0307496 | A1 | * | 10/2020 | Jimenez | B60R 21/01554 |

FOREIGN PATENT DOCUMENTS

| | | | | |
|---|---|---|---|---|
| DE | 102008012853 A1 | * | 9/2009 | ........... B60N 2/4235 |
| DE | 102012103036 A1 | * | 10/2013 | ............... B60N 2/24 |

* cited by examiner

*Primary Examiner* — Amy R Weisberg
*Assistant Examiner* — Veronica M Shull
(74) *Attorney, Agent, or Firm* — Lee & Hayes, P.C.

(57) ABSTRACT

A safety structure includes a seat, having a base and a seatback, a motion control assembly, and an energy absorber. The motion control assembly is configured to translate and/or rotate during a collision. The energy absorber includes a first end configured to couple to the seatback proximate the base, and a second end configured to couple to a structural support of a vehicle. The energy absorber is configured to deform during the collision to absorb energy and based on the translation and/or rotation of the motion control assembly.

20 Claims, 10 Drawing Sheets

SAFETY STRUCTURE WITH ENERGY ABSORBER(S) AND MOTION CONTROL ASSEMBLY FOR REARWARD-FACING OCCUPANT

BACKGROUND

A seat for an occupant of a vehicle is designed for safety to reduce risk of injury to the occupant in the event of an abrupt movement or a collision involving the vehicle. During a collision, seatbelts may be a primary safety feature for occupants facing the direction of a collision (e.g., front facing occupants during a frontal collision). However, seatbelts provide limited protection for rearward-facing occupants (e.g., occupants facing a direction opposite a direction from which the collision occurs).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
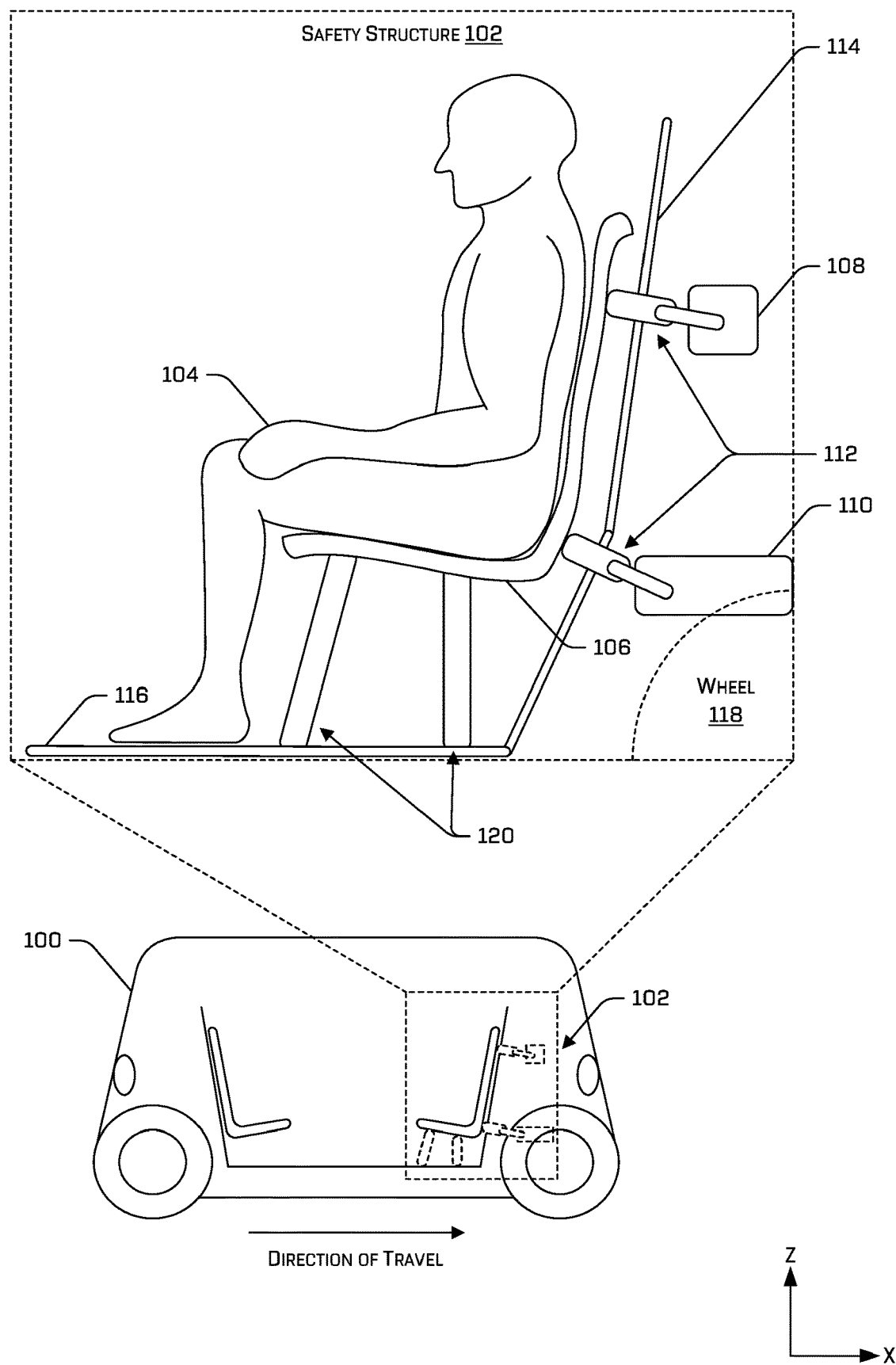
FIG. 1 illustrates an example safety structure of a vehicle that includes energy absorber(s) for safely protecting a rearward-facing occupant in the event of a collision of the vehicle, according to an example of the present disclosure.

This application relates to a safety structure that protects occupant(s) of a vehicle in an event of a collision. In some instances, the safety structure may be integrated into a seat and/or the vehicle for absorbing energy during the collision. For example, energy absorber(s) may couple to the seat, or a frame of the seat, as well as frames, structures, sub-frames, or other structural members of the vehicle. The coupling of the energy absorber(s) to the seat and the structural member(s) allow for the energy absorber(s) to absorb forces that may be otherwise imparted to the occupant(s). For example, in the event of a collision, the energy absorber(s) may deflect, deform, crumple, or otherwise absorb forces associated with the collision. In some instances, the forces may be imparted to the structural member(s) of the vehicle. Moreover, the energy absorber(s) may deflect or absorb energy in one or more directions for protecting the occupant from different forces experienced during the collision. For example, the energy absorbers may couple to a back of the seat and a bottom of the seat to absorb vertical and/or horizontal forces during the collision. A motion control assembly may also control a movement or travel path of the seat during a collision. The energy absorber(s) and the motion control assembly are configured to minimize the force applied to the occupant with a limited distance over which deceleration occurs to prevent injury.

In some instances, the energy absorber(s) may include dampers (e.g., pneumatic, hydraulic, etc.), physical structure(s) (e.g., crush tubes, bumpers, bars, arms, legs, etc.), and/or materials (e.g., foam). Generally, the energy absorber(s) described herein may be designed to absorb energy over a length of travel (e.g., compression) in order to minimize forces transmitted to occupant(s) of the vehicle while the vehicle is rapidly decelerated due to collision with an object. In some instances, the energy absorber(s) and/or the motion control assembly may be coupled to, or between, various portions of the seat and the structural members of the vehicle. For example, in some instances, the vehicle may include one or more cross-members that extend between opposing lateral sides of the vehicle.

The cross-members may represent, or be a component of, a frame of the vehicle to which other components of the vehicle couple. The cross-members may include high-strength materials that are relatively rigid and which are not easily deformable (e.g., steel, composites, alloys, etc.). In effect, the high-strength materials of the cross-members may absorb forces during the collision, without deflecting, to reduce accelerations experienced by the occupant(s). In some instances, the cross-members may be located behind seats of the vehicle. The structural members may also include longitudinal members that extend in a lengthwise direction of the vehicle. The longitudinal members may couple (e.g., weld, fasten, etc.) to the cross-members to form the frame of the vehicle. In the examples described herein, forces are transferred from the energy absorber(s) and/or the motion control assembly to the vehicle via the coupling between the energy absorber(s) and the motion control assembly, to the structural members of the vehicle, respectively. Additionally, or alternatively, in some instances the seat may include one or more materials and/or a construction configured to compress during deceleration of the occupant.

In some instances, one or more first energy absorber(s) may couple to a back of the seat (e.g., seatback). For example, a first of the one or more first energy absorber(s) may couple to the back of the seat, proximal to a top of the seat, and/or a second of the one or more first energy absorber(s) may couple to the back of the seat, proximal to a bottom of the seat. The positioning of the one or more first energy absorber(s) may serve to absorb forces imparted to the back of the occupant. For example, the first of the one or more first energy absorber(s) may absorb forces experienced by an upper portion of the back (e.g., thoracic region), whereas the second of the one or more first energy absorber(s) may absorb forces experienced by a lower portion of the back (e.g., lumbar region). In such instances, the one or more first energy absorber(s) may include dampers (e.g., pneumatic and/or a crush tube) that horizontally and/or vertically compress in the event of a collision. In some instances, the one or more first energy absorber(s) may deflect upon experiencing a threshold amount of force (e.g., approximately 3000 pounds). The threshold amount of force may, in some instances, be based at least in part on a mass of the occupant, a mass of the seat, an orientation of the first energy absorber(s), an orientation of the motion control assembly, and so forth. Additionally, the one or more first energy absorber(s) may dampen recoil and/or rebound forces imparted to the occupant during and/or after the collision.

The motion control assembly may couple to a bottom of the seat (e.g., base), a back of the seat, and/or sides of the seat. In one example, the motion control assembly may include legs, elongated links, arms, or other members that extend from a floorboard (or structural member) of the vehicle to the bottom of the seat. In such instances, the legs may include rigid elements (e.g., steel, aluminum, etc.) that, in the event of a collision, translate, rotate, or otherwise deform (e.g., buckle) upon experiencing a threshold amount of force (e.g., approximately 3000 pounds). The legs, in some instances, may pivotably or fixedly couple to the seat and/or the vehicle. In some instances, any number of legs may couple to the seat, such as two, four, six, and so forth.

In some instances, the legs may be of varying lengths in comparison to one another and/or disposed at a different orientations relative to the vehicle and/or between the vehicle and the seat. The variation in the lengths and/or orientation of the legs may assist in absorbing energy associated with the collision. For example, legs of different lengths and/or orientation may control a movement of the seat (and therefore the occupant), in horizontal and/or vertical directions, and/or about one or more axes. Such control may increase a safety and/or comfort of the occupant in the event of a collision. That is, the variation in the length and the orientation of the legs may effectuate to control a position of the seat during a collision (e.g., upward movement, downward movement, lateral movement, etc.). By way of example, if the leg(s) at the front of the seat are longer than the legs at the back of the seat, during a collision, the leg(s) at the front may buckle prior to the legs at the back, causing the seat to collapse backward. This may, in some instances, prevent the occupant from rebounding off the seat back and accelerating forward (e.g., whiplash).

The motion control assembly coupled to the bottom of the seat may include slides or other linear actuators. The linear actuators, for example, may horizontally translate (e.g., relative to a direction of travel) upon experiencing a threshold amount of force (e.g., approximately 3000 pounds). For example, in the event of a collision, the linear actuators may translate to absorb forces imparted to the occupant. In conjunction with the one or more first energy absorber(s) coupled to the back of the seat, upon translating, the one or more first energy absorbers may dampen the forces being imparted to the occupant. In other words, the linear actuators may slide and impart energy to the one or more first energy absorber(s), which may dampen forces being imparted to the occupant.

In some instances, the energy absorber(s) and the motion control assembly may increase the safety of rearward facing occupant(s) in the vehicle. For example, in some instances, the vehicle may include a bi-directional vehicle that is cable of traveling in different directions. During travel, some of the occupants of the vehicle may be rearward-facing, relative to the direction of travel. In the event of a head-on, or frontal collision, the energy absorber(s) and the motion control assembly provide a way to decelerate rearward-facing occupants in a controlled manner. For example, the energy absorbers and/or the motion control assembly may reduce or otherwise dampen high accelerations during the collision, safely bringing the occupant(s) to a standstill. In some instances, such as in the case of a bi-directional vehicle, the vehicle may include energy absorber(s) and/or motion control assemblies disposed at both longitudinal ends of the vehicle. As such, regardless of a direction of travel, the energy absorber(s) and the motion control assembly(ies) may safely protect rearward-facing occupant(s).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 is an illustration of an example vehicle 100 that includes An example safety structure 102 having energy absorber(s) for safely protecting occupant(s) of the vehicle 100 in the event of a collision with another vehicle, object, and so forth. The vehicle 100 shown in FIG. 1 is a bi-directional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 100 may be a fully or partially autonomous vehicle having any other level or classification. Moreover, in some instances, the energy absorbers and motion control assemblies described herein may be applicable to non-autonomous and/or non-bidirectional vehicles as well.

In some instances, the vehicle 100 may include both forward-facing and/or rearward-facing seats. For example, as shown in FIG. 1, an occupant 104 is shown seated in a seat 106, which may be representative of a rearward-facing seat, relative to a direction of travel of the vehicle 100. In some instances, the seat 106 may be a component of a carriage-style arrangement where more than one seat is included. However, in such instances and as discussed herein, seat(s) of the carriage style arrangement may include respective energy absorber(s) and motion control assembly(ies) for safely protecting occupants within the seat(s), respectively. In other examples, the seat of the carriage-style seating may include common energy absorber(s) and motion control assembly.

The safety structure 102 (or more generally, the vehicle 100) may include members that absorb forces, accelerations, and so forth from being imparted to the occupant 104. For example, the safety structure 102 may include the seat 106, frames (e.g., structural supports), such as a first frame 108 and a second frame 110, energy absorbers 112 a motion control assembly 120, and/or a body structure 114 (e.g., bulkhead, wet-dry barrier, fire-barrier, panel, etc.). The safety structure 102 may protect the occupant 104 from frontal collisions (e.g., head-on collisions).

In some instances, the seat 106 may include a base configured to support at least a portion of a weight of the occupant 104, and a seatback configured to provide support to a back of the occupant 104. Although not shown, the seat 106 or the vehicle 100 may include a headrest to support a head of the occupant 104, and/or the seat 106 may be sized differently so as to support the head of the occupant 104. The seatback may include a front surface configured to face the back of the occupant 104 and a back surface opposite the front surface. The seatback may also include an intermediate portion between the front surface and the back surface, including materials for increasing a ride comfort to the occupant 104. As discussed herein, the energy absorbers 112 may transfer forces from the occupant 104 to the first frame 108 and the second frame 110, or other structural members of the vehicle 100. For example, when the back of the occupant 104 pushes against the front surface of the seat 106, such as during a collision, the energy absorbers 112 may compress and the seat 106 may move rearward (e.g., in the direction of travel). However, minimal accelerations may be imparted to, or experienced by, the occupant 104 given the coupling of the energy absorber(s) 112 and the motion control assembly 120 to the first frame 108, the second frame 110, and additional structure members of the vehicle 100.

The first frame 108 and the second frame 110 may represent a frame or other structure of the vehicle 100. The first frame 108 and the second frame 110 may include high-strength materials that provide structural rigidity to the vehicle 100 (e.g., steel, composites, aluminum, etc.). In some instances, the first frame 108 and/or the second frame 110 may represent cross-members that are laterally disposed across the vehicle 100 (Y-direction into the page), between opposing sides of the vehicle 100. The first frame 108 and/or the second frame 110 may be disposed interior to a wheelhouse of the vehicle 100 where a wheel 118 is disposed. However, although the second frame 110, for example, is shown disposed at a certain position relative to the wheel 118, the second frame 110 may be disposed elsewhere (e.g., in front of the wheel 118, above the wheel 118, behind the wheel 118, etc.). The first frame 108 may also be located elsewhere other than shown.

As also shown, the first frame 108 may be disposed vertically above (Z-direction) the second frame 110. Further, although the first frame 108 and the second frame 110 are shown including a certain shape and/or size, the first frame 108 and the second frame may take other shapes (e.g., circular, square, rectangular, etc.). Components of the vehicle 100, such as drive mechanisms, axles, batteries, and so forth may couple to the first frame 108, the second frame 110, and/or additional frames (e.g., structures, subframes, etc.) of the vehicle 100.

Introduced above, the energy absorbers 112 and/or the motion control assembly 120 may couple to the first frame 108 and/or the second frame 110. For example, the energy absorbers 112 are shown being coupled to the first frame 108 and the second frame 110. In some instances, a first of the energy absorbers 112 may couple to the first frame 108 and a second of the energy absorbers 112 may couple to the second frame 110. Additionally, the energy absorbers 112 are shown being coupled to the seat 106 (e.g., fixedly, pivotably, etc.). In this sense, the energy absorbers 112 may extend between the seat 106 (or a frame thereof) and the first frame 108 and/or the second frame 110.

The coupling of the seat 106 to the first frame 108 and/or the second frame 110 allows for the forces generated by the occupant 104, and experienced by the seat 106, to be imparted to the first frame 108 and/or the second frame 110. Noted above, the structural rigidity of the first frame 108 and the second frame 110 may be configured to absorb such forces, without deformation, to safely bring the occupant 104 to a standstill during a collision. For example, the energy absorbers 112 may be displaced in one or more directions (X-direction and/or Z-direction) to absorb such forces. For example, the energy absorbers 112 may translate horizontally (X-direction) and/or vertically (Z-direction). Moreover, the energy absorbers 112 are shown being coupled to different portions of the seat 106 for absorbing forces along a range of vertical and horizontal positions.

In some instances, the energy absorbers 112 may be disposed at various angles relative to the seat 106, the first frame 108, the second frame 110, and/or other portions of the vehicle 100. For example, the energy absorbers 112 may be disposed at various angles relative to a horizontal place (X-plane). The orientation of the energy absorbers 112 may permit for the absorption of more energy during collisions at the front of the vehicle 100. In some instances, the angle of the energy absorbers 112 may be between about 0° and about 30° relative to the horizontal plane of the vehicle 100 (both positive and negative directions relative to the horizontal plane). In some instances, the energy absorbers 112 may be disposed at different angles in comparison to one another. For example, the energy absorbers 112 may couple to the seat at an orthogonal angle.

The angling of the energy absorbers 112 may control a movement of the occupant 104 and/or may control a compression of the energy absorbers 112 during a collision. That is, the coupling of the energy absorbers 112 to the seat 106, as well as their respective included angles, may control a movement of the seat 106 during the collision. For example, by angling the energy absorbers 112 upward (relative to the X-axis), the seat 106 may experience a downward movement (e.g., tilt) in the event of a collision. However, the energy absorbers 112 may be oriented differently than shown (or relative to the seat 106, the first frame 108, and/or the second frame 110) for controlling a movement of the seat 106 during the collision.

The energy absorbers 112 may be disposed at least partially through openings, receptacles, or other features of the body structure 114. In some instances, the body structure 114 may serve as a wet-dry barrier between the occupant 104 (or a passenger compartment of the vehicle 100) and other portions of the vehicle 100. Additionally, the body structure 114 may serve as a fire barrier and/or a noise barrier. Still, the body structure 114 may have a structural integrity that may, in some instances, assist in absorbing energy in the event of a collision.

In some instances, the seat 106 may be spaced apart from the body structure 114 to allow the seat 106 to translate rearward during a collision (given the compression of the energy absorbers 112). In other words, a gap distance may be interposed between a back of the seat 106 and the body structure 114 to permit the seat 106 to translate in the event of a collision. Additionally, or alternatively, the body structure 114 may be spaced apart from the first frame 108 and/or the second frame 110. However, in some instances, the body structure 114 may couple to the first frame 108 and/or the second frame 110, and/or the seat 106 may couple to the body structure 114. In the latter instance, the body structure 114 may be spaced apart from the first frame 108 and/or the second frame 110 to allow displacement of the seat 106 and/or the body structure 114. In some instances, the coupling of the seat 106 to the body structure may assist in distributing forces during collision and avoiding point loads caused by intervening frames or support structures.

Although the safety structure 102 shown in FIG. 1 includes two of the energy absorbers 112, more than two of the energy absorbers 112 may be included. For example, the safety structure 102 may include only one energy absorber 112, or may include more than two energy absorbers 112, such as three. Additionally, the energy absorbers 112 may be placed elsewhere relative to the seat 106, on the back of the seat 106, and so forth. Still, the energy absorbers 112 may be disposed at other orientations than shown in FIG. 1.

In some instances, the energy absorbers 112 may represent crush-can type structures that deform (e.g., collapse) in the event of a collision (e.g., composite honeycomb, aluminum cells, etc.), hydraulic and/or pneumatic actuators (e.g., cylinders, struts) that compress in the event of a collision, springs, dampers, or materials that plastically deform to otherwise absorb energy in the event of a collision (e.g., foam). Regardless of the specific implementation, the energy absorbers 112 may be configured to compress upon experiencing a threshold amount of force (e.g., approximately between 3000 pounds and 4000 pounds). The threshold amount of force may minimize forces experienced by the occupant over a distance of travel. That is, the threshold amount of force may limit both a degree of travel by the occupant as well as the amount of force imparted to the occupant.

The motion control assembly 120 is shown being coupled to a bottom of the seat 106 (e.g., base) and a floorboard 116. In some instances, the floorboard 116 may be a component of the body structure 114. In some instances, the motion control assembly 120 may represent rigid legs, links, etc. that are deformable in the event of a collision. For example, the motion control assembly 120 may buckle, bend, and/or twist during a collision, and upon experiencing a threshold amount of force (e.g., 2000 pounds). The amount of force required to deform the motion control assembly 120 may be based at least in part on the cross-section, length, orientation, etc. of the legs of the motion control assembly 120. That is, in some instances, the legs may include different lengths, different cross-sections (e.g., shape, thickness, size, etc.), and/or may be disposed at various angles relative to the seat 106 and/or the floorboard. The variation of the length and/or orientation, for example, may assist in controlling a movement of the seat 106 in the event of a collision. For example, legs with shorter lengths may require an increased force to buckle, as compared to legs with longer lengths, which may require a reduced amount of force to buckle. This may, in effect, increase the amount of force required to buckle and in turn, reduce accelerations experienced by the occupant 104. For example, depending on which of the legs buckle first, a movement of the seat 106 may be controlled in particular orientations or directions to increase a safety of the occupant 104.

In some instances, the legs may be fixedly or pivotably coupled to the seat 106 and/or the floorboard 116. In some instances, the seat 106 and/or the floorboard 116 may include flanges, brackets, plates, and/or receptacles to which motion control assembly 120 couples (e.g., fasteners). In instances where the legs of the motion control assembly 120 include different lengths, flanges, for example, may extend from the seat 106 and/or the floorboard 116. However, in the event of a collision, the flanges may impart forces to the legs such that the motion control assembly 120 buckles to absorb forces during the collision.

In some instances, any number of legs may be disposed between the seat 106 and the floorboard 116 (and/or couple to the second frame 110, or other structural support). For example, the motion control assembly 120 may include for legs, where the legs couple to the bottom at corners of the seat 106. However, the motion control assembly 120 may include more than, or less than, four legs. Additionally, the legs may include different cross-sections or overall shapes, such as being "L-shaped" or "C-shaped" legs that extend between the seat 106 and the floorboard 116. Regardless of the cross-sectional shape, the overall shape of the legs may be an elongated (e.g., a cylinder or square tube), L-shape, C-shape, I-shape, or any other shaped path. The different cross-sections and/or shapes of the legs may provide for increased storage under the seat 106 and/or improved absorption of forces during a collision. However, other leg or swingarm designs are envisioned.

Although the motion control assembly 120 is shown, or described, as being legs that buckle, the motion control assembly 120 may include dampers, crush-cans, or other members that absorb forces during a collision. Additionally, or alternatively, the motion control assembly 120 may include linear slides that translate in a horizontal direction (e.g., X-direction) in the event of the collision. In such instances, the linear slides may translate and/or rotate upon experiencing a threshold amount of force. For example, the seat 106 may couple to the linear slides and when the forces overcome the threshold amount of force, the linear slides may translate. In such instances, the energy absorbers 112 may assist in dampening the forces experienced by the occupant 104.

In FIG. 1, the safety structure 102 is shown and described with regard to a single seat (e.g., the seat 106). However, the safety structure 102 may be implemented within other seats, or stated alternatively, other seats of the vehicle 100 may include couple to additional energy absorbers and/or additional motion control assemblies. Additionally, in any of the examples described herein, the energy absorbers 112 and/or the motion control assembly 120 may be coupled directly or indirectly to the frames and/or other structural supports of the vehicle 100.

Figure 2A:
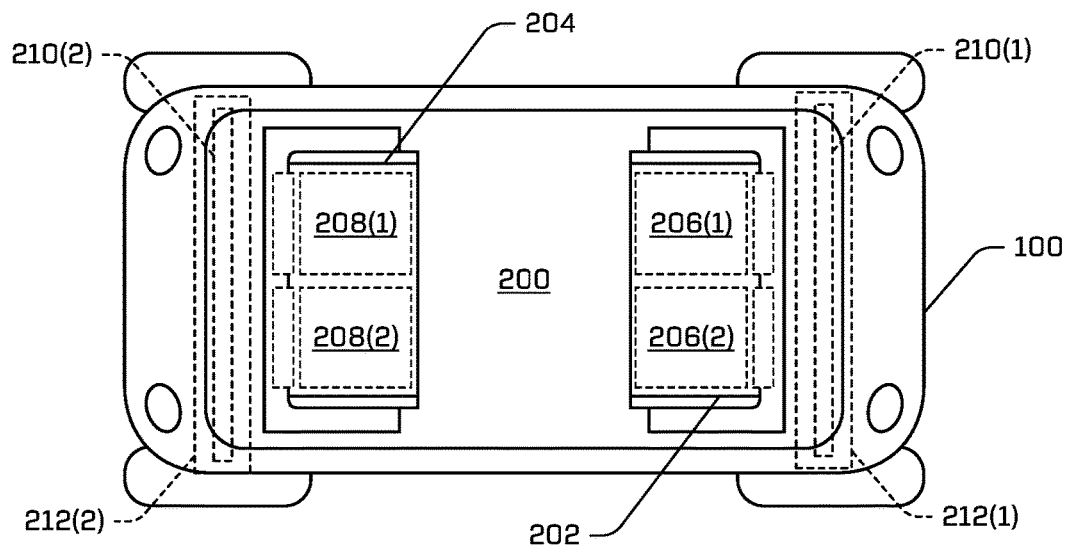
FIG. 2A illustrates a top view of an example seating structure of a vehicle, according to an example of the present disclosure.

FIG. 2A illustrates a detailed view of seats within the vehicle 100. The vehicle 100 includes a passenger compartment 200 where occupant(s) (or passenger(s)) are located. The passenger compartment 200 may be accessible via doors disposed along lateral sides of the vehicle 100, between opposing longitudinal ends of the vehicle 100.

In some instances, the passenger compartment 200 may include a plurality of seats for accommodating occupant(s). For example, the vehicle 100 may include two seating structures, such as a first seating structure 202 and a second seating structure 204. In other examples, any number of seating structures may be disposed in the passenger compartment 200 other than what is included in FIG. 2A. For example, though illustrated as two bench-style seats which can accommodate multiple occupants, in some examples, the passenger compartment may include multiple individual bucket-style seats.

The first seating structure 202 and the second seating structure 204 may be configured with any number of seats, such as two. For example, as shown in FIG. 2A the first seating structure 202 may include two seats, including a first seat 206(1) and a second seat 206(2), and the second seating structure 204 may include two seats, including a first seat 208(1) and a second seat 208(2). Each of the seats of the first seating structure 202 and the second seating structure 204 may accommodate a respective occupant. The seats of the first seating structure 202 and the second seating structure 204 may be similar to, or represent, the seat 106 discussed above with regard to FIG. 1.

In some instances, the seats of the first seating structure 202 and/or the seats of the second seating structure 204 may be covered with a polyurethane cover. This may provide the first seating structure 202 and the second seating structure 204 with a bench-style appearance. However, the seats of the first seating structure 202 and the second seating structure 204 may move independently of one another in the event of a collision. Additionally, each of the seats of the first seating structure 202 and the second seating structure 204 may include a safety structure, such as the safety structure 102 discussed above with regard to FIG. 1, including the energy absorber(s) 112 and/or the motion control assembly 120 that protect the occupants in the event of a collision. In this sense, the first seating structure 202 and the second seating structure 204 may appear as a single bench-style seat, respectively, but the first seat 206(1) and the second seat 206(2) of the first seating structure 202 and the first seat 208(1) and the second seat 208(2) of the second seating structure 204 may couple to respective energy absorber(s) 112 and/or motion control assemblies 120 that translate independently of one another in the event of a collision. However, in some instances and as noted above, the first seat 206(1) and the second seat 206(2) of the first seating structure 202 and the first seat 208(1) and the second seat 208(2) may resemble bucket-style seats.

The vehicle 100 includes structural supports, or frames, to which energy absorbers 112 and/or the motion control assembly 120 couple. For example, the vehicle 100 may include first frames 210, such as first frames 210(1) and 210(2). The first frames 210 may be similar to, or represent, the first frame 108 as discussed above with regard to FIG. 1. Additionally, the vehicle 100 may include second frames 212, such as second frames 212(1) and 212(2). The second frames 212 may be similar to, or represent, the second frame 110 as discussed above with regard to FIG. 1. As discussed above, the energy absorbers 112 and/or the motion control assemblies 120 may couple between each of the seats of the first seating structure 202 and the second seating structure 204, and the first frames 210 and/or the second frames 212. For example, the first seat 206(1) and the second seat 206(2) of the first seating structure 202 may couple to the first frame 210(1) and/or the second frame 212(1) via one or more energy absorbers 112 and/or the motion control assembly 120. As shown, the first frames 210 and the second frames 212 may be disposed between a respective longitudinal end of the vehicle 100 and the first seating structure 202 or the second seating structure 204, respectively.

In some instances, because of the bi-directionality of the vehicle 100, each of the first seating structure 202 (and the first seat 206(1) and the second seat 206(2)) and the second seating structure 204 (and the first seat 208(1) and the second seat 208(2)) may, at different times, be a leading or trailing seat, as determined by the direction of travel of the vehicle 100. Also, each of the first seating structure 202 and the second seating structure 204 may, at different times, be a forward-facing seat or a rearward-facing seat, as determined by direction of travel of the vehicle 100. Therefore, bi-directional vehicles may include the energy absorbers 112 and/or the motion control assembly 120 proximate to longitudinal ends of the vehicle 100 to protect occupants in both the first seating structure 202 and the second seating structure 204. However, in other examples, the vehicle 100 may include the energy absorbers 112 and/or the motion control assembly 120 on only one longitudinal end of the vehicle 100.

As shown, the vehicle 100 includes four wheels with two wheels/tires positioned at each longitudinal end of the vehicle 100. In some instances, the first frames 210 and/or the second frames 212 may be disposed between the wheels (or more generally, the sides) of the vehicle 100. Additionally, body structures, such as the body structure 114 discussed above with regard to FIG. 1, may be disposed between the first seating structure 202, the second seating structure 204, the first frames 210, and/or the second frames 212, at respective longitudinal ends of the vehicle 100.

Figure 2B:
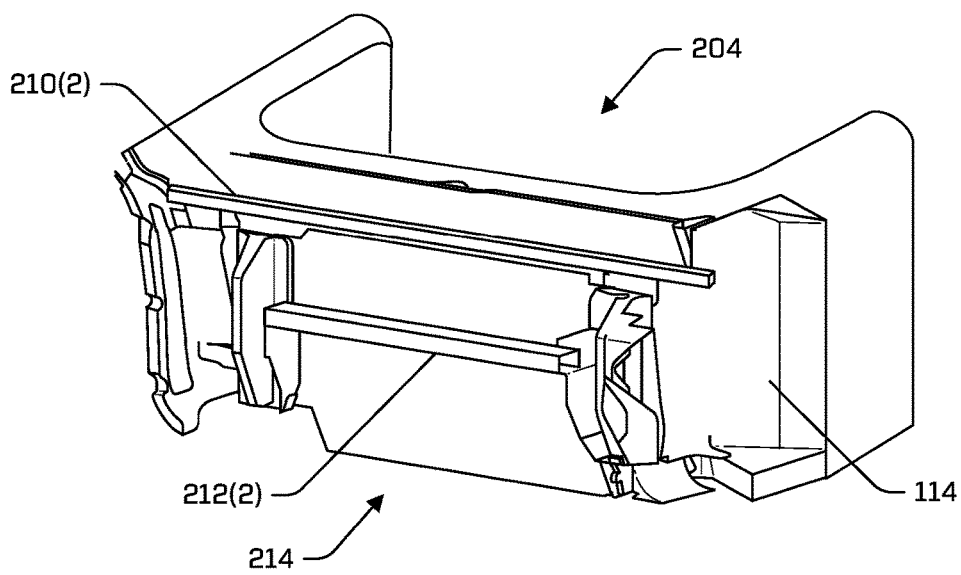
FIG. 2B illustrates a perspective view of the example seating structure of the vehicle of FIG. 2A, according to an example of the present disclosure.

FIG. 2B illustrates a portion of a safety structure 214 disposed at a longitudinal end of the vehicle 100, proximate to the second seating structure 204. The safety structure 214 may be similar to safety structure 102 discussed above with regard to FIG. 1, and may include, for example, a body structure 114, the first frame 210(2), the second frame 212(2), as well as the energy absorbers 112 and the motion control assembly 120 (not shown).

The energy absorbers 112 and/or the motion control assembly 120 are configured to deform (e.g., compress, buckle, etc.), translate, rotate, etc. in response to a compressive force, discussed in further detail below. In some instances, the energy absorbers 112 and/or the motion control assembly 120 couple to the first frame 210(2), the second frame 212(2), and/or the body structure 114 to spread loads generated during a collision. In some instances, the energy absorbers 112 and/or the motion control assembly 120 may directly or indirectly couple to the first frame 210(2), the second frame 212(2), and/or the body structure 114. Energy produced by an impact force to the energy absorbers 112 and/or the motion control assembly 120 are transferred to the first frame 210(2), the second frame 212(2), and/or the body structure 114, which disperse the force to a larger area throughout the vehicle 100. This transfer may be facilitated through fixed joints, comprising, for example, fasteners, molded connections, among others, and/or reaction surfaces. Moreover, the motion control assembly 120 may absorb forces experienced during the collision by deforming. As such, the first frame 210(2), the second frame 212(2), and/or the body structure 114 are formed from a more rigid material and/or structure than the energy absorbers 112 and/or the motion control assembly 120 and do not deform under the same force.

In addition to dispersing the impact energy through their own structure, the first frame 210(2), the second frame 212(2), and/or the body structure 114 may spread the impact force to other structures that serve as additional load transfer paths for the impact energy. Additional load path structures may include beams, sub-frames, etc.

Figure 3A:
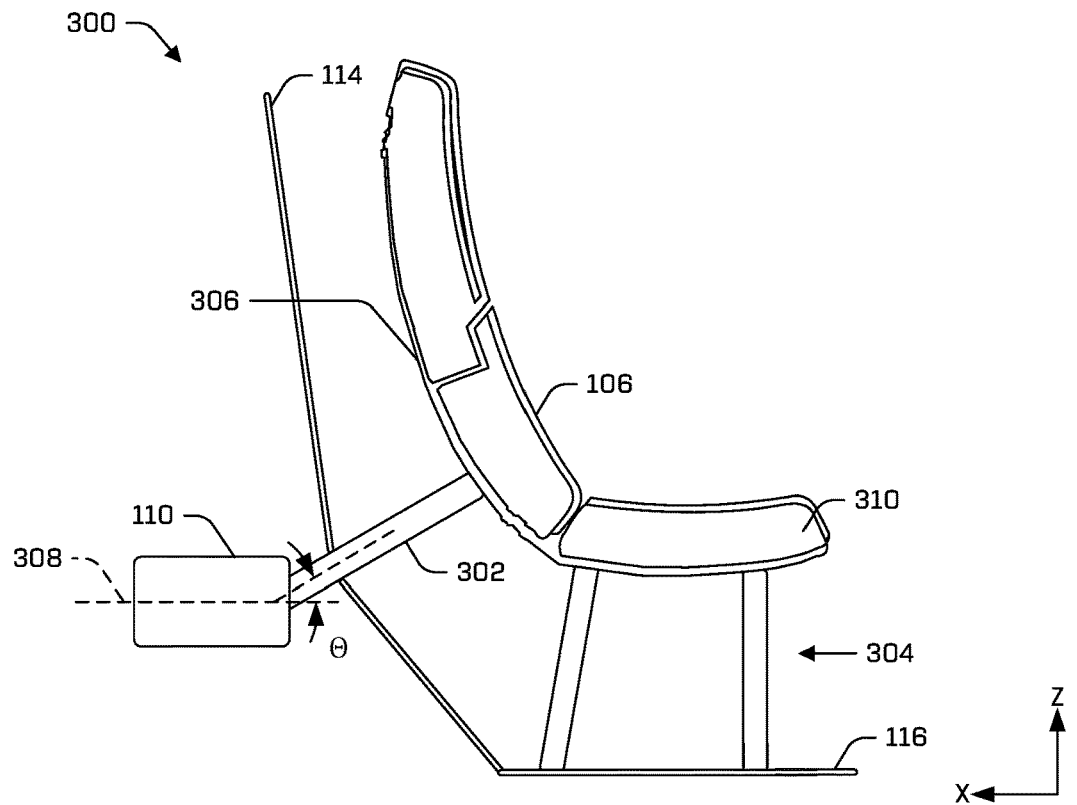
FIG. 3A illustrates a first view of example energy absorbers coupled to an example seat of a vehicle, according to an example of the present disclosure.

FIG. 3A illustrates an example safety structure 300 for absorbing forces associated with a collision. In some instances, the safety structure 300 may include the body structure 114, the second frame 110, an energy absorber 302, and legs 304 (which may represent the motion control assembly 120). The energy absorber 302 may couple to a rear (seatback) of the seat 106, or a frame 306 of the seat 106, and the second frame 110. In some instances, the energy absorber may couple to a lower region of the seat 106 (or a lower region of the seatback) to support the lumbar region of the occupant during the collision. The legs 304 are shown coupled to bottom of the seat 106 (base), or the frame 306 of the seat 106, and the floorboard 116. In some instances, the seatback and the base of the seat 106 may be separate frames, or portions, such that the seat 106 may fold (e.g., about the Z-axis).

The energy absorber 302 may represent a damper (e.g., pneumatic, hydraulic, etc.) that absorbs energy experienced by the seat 106 in the event of a collision. For example, the energy absorber 302 may compress horizontally and/or vertically to lessen accelerations experienced by an occupant in the seat 106. In some instances, the energy absorber 302 may extend through the body structure 114 for coupling to the second frame 110. As also shown, the seat 106 may be disposed away from the body structure 114 to allow the seat 106 to translate (via the compression of the energy absorber 302) in the event of a collision.

In some instances, the energy absorber 302 may be disposed at an angle θ relative to a horizontal plane or axis (X-plane or X-axis) of the vehicle 100, or a horizontal plane 308 of the second frame 110. However, the angle θ may be relative to the floorboard 116, a base of the seat 106, or other horizontal structure. In some instances, the angle θ may be between approximately zero (0) degrees and approximately 30 degrees. Although the angle θ is shown about the Z-axis and in the positive Y-direction (e.g., counterclockwise about the Z-axis), the angle θ may be about the Z-axis in the negative Y-direction (e.g., clockwise about the Z-axis). In such instances, the energy absorber 302 may be slanted downward. Angling the energy absorber 302 in this manner may result in minimal forces being experienced by the occupant. For example, in the event of a collision, the energy absorber 302 may be substantially parallel (e.g., in-line) with forces exerted by the occupant or as experienced by the seat 106.

In some instances, the energy absorber 302 may fixedly or pivotably couple to the second frame 110 and/or the seat 106 via fasteners (e.g., bolts), being welded, and so forth. The second frame 110 and/or the seat 106 may also include flanges, receptacles, plates, or other features for receiving and coupling to the energy absorber 302.

The legs 304 are shown extending between the seat 106 and the floorboard 116. In such instances, the floorboard 116 may couple to frames of the vehicle 100, such as the second frame 110 or frames spanning a longitudinal length of the vehicle 100. In some instances, the legs 304 may couple to the seat 106 and/or the floorboard 116 via flanges, plates, or other type features. Such coupling may come by way of fasteners, welding, and so forth. The legs 304 may be circular-shaped, square-shaped, or other cross-sectional shape. The legs 304 include rigid materials that deform in the event of a collision and upon experiencing threshold amount of force.

In some instances, the legs 304 may include different lengths, thickness, cross-sections, and so forth. The variations between the legs 304, for example, in length, may control a movement of the seat 106 in the event of a collision, or a travel path of the occupant during the collision. For example, by including legs 304 with various lengths relative to one another, the seat 106 may move by different amounts in the horizontal (X-direction) and/or vertical directions (Z-direction). In such instances, the motion control assembly may control a translation and/or rotation of the seat 106. This may be accomplished, at least in part, in instances where the legs 304 are of a different length. Here, flanges or other members may extend from the seat 106 and/or the body structure 114 for receiving and coupling to the legs 304.

Additionally, or alternatively, the legs 304 may be disposed at various angles relative to the seat 106 and/or the floorboard 116. For example, the legs 304 may be disposed substantially perpendicular (Y-direction and Z-direction), and/or may be oriented inward (Z-direction into page), outwards (Z-direction out of page), frontward (X-direction), or backwards (opposite X-direction). Such orientation of the legs 304 may further assist in controlling a movement of the seat 106 in the horizontal (X-direction) and/or vertical directions (Z-direction). In some instances, each of the legs 304 may include a respective length and respective angle at which the legs 304 are disposed.

The seat 106 may further include padding 310, such as foam, or other structures that are configured to compress in the event of a collision to protect the occupant.

Figure 3B:
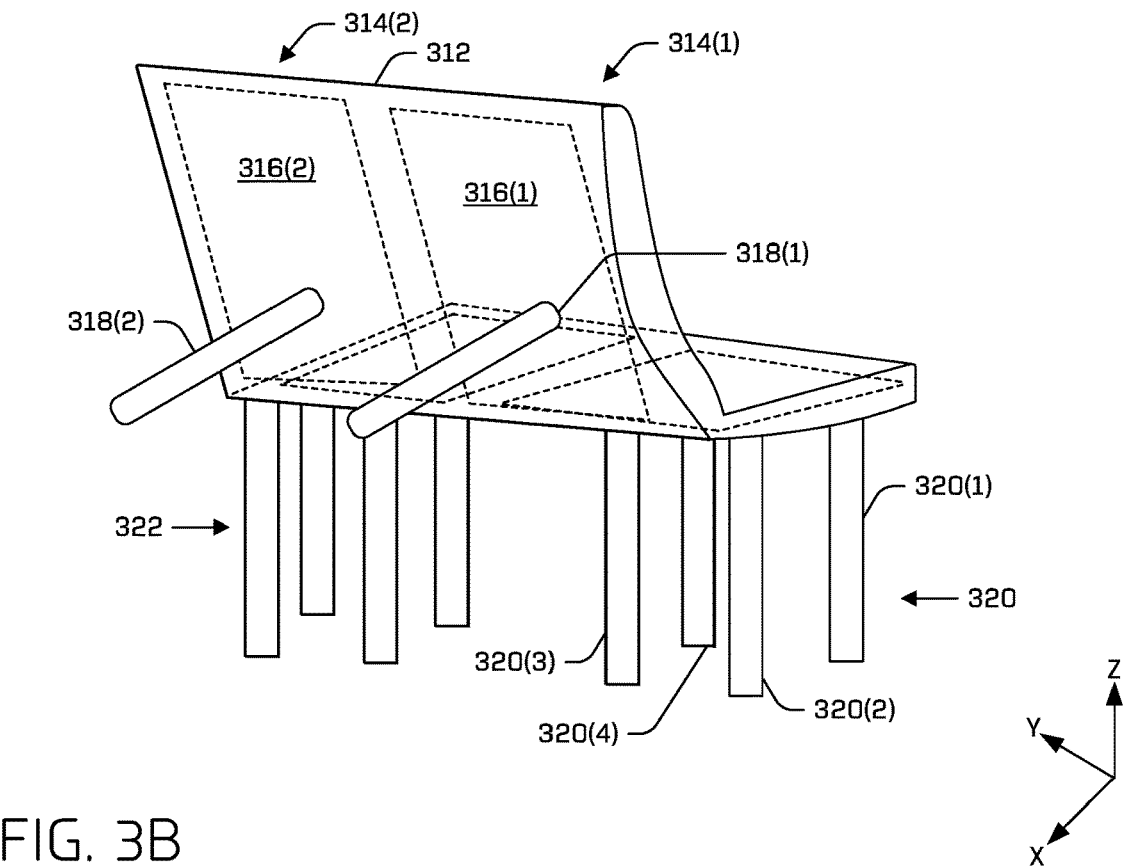
FIG. 3B illustrates a second view of the energy absorbers of FIG. 3A coupled to seats, according to an example of the present disclosure.

FIG. 3B illustrates seats of FIG. 3A embodied within a seating structure 312. As shown, the seating structure 312 may be configured to seat multiple occupants, where a first occupant sits within a first seat 314(1) and a second occupant sits within a second seat 314(2). Each of the first seat 314(1) and the second seat 314(2) may be similar to, or represent, the seat 106. For example, the first seat 314(1) may include a first seat frame 316(1) and the second seat 314(2) may include a second seat frame 316(2). The first seat frame 316(1) and/or the second seat frame 316(2) may be disposed along the back and/or bottom of the first seat 314(1) and the second seat 314(2), respectively. However, the first seat 314(1) and the second seat 314(2) may visually appear to be a single, bench-style, seat. For example, a cover (e.g., polyurethane cover) may be disposed over the first seat 314(1) and the second seat 314(2) such that the seating structure 312 appears as a bench-style seat.

A first energy absorber 318(1) is shown coupled to the back (seatback) of the first seat 314(1) (or the first seat frame 316(1)) and a second energy absorber 318(2) is shown coupled to the back (seatback) of the second seat 314(2) (or the second seat frame 316(2)). The first energy absorber 318(1) and the second energy absorber 318(2) may be similar to the energy absorber 302, and couple to the second frame 110 (not shown in FIG. 3B). In some instances, the first energy absorber 318(1) and the second energy absorber 318(2) may be disposed proximate a bottom of the seat structure 312, or a bottom/lower portion of the first seat 314(1) and the second seat 314(2), respectively. However, first energy absorber 318(1) and the second energy absorber 318(2) may be coupled to the first seat 314(1) and second seat 314(2) at other portions, such as more proximate to a top (Z-direction) of the first seat 314(1) and the second seat 314(2), respectively.

First legs 320 are shown coupled to the bottom (base) of the first seat 314(1). As shown, the first legs 320 may include four legs, such as leg 320(1), leg 320(2), leg 320(3), and leg 320(4). The first legs 320 may extend between the first seat 314(1) and the floorboard 116 (not shown in FIG. 3B). As shown, the first legs 320 may be disposed substantially vertically upwards (e.g., orthogonal to the Y-axis and the Z-axis). However, the first legs 320 may be oriented at different angles relative to the Y-axis and/or the Z-axis, such as being slanted inwards/outwards (e.g., relative to the Z-axis in the Y direction) and/or forward/rearward (e.g., relative to the Z-axis in the X-direction). Moreover, in some instances, the first legs 320 may be coupled to the seatback and/or sides of the first seat 314(1).

Additionally, or alternatively, the first legs 320 may be shorter and/or longer in length than illustrated. In some instances, the first legs 320 may include different respective lengths in comparison to one another. Noted above, the variation in the orientation and lengths of the first legs 320 may control a movement of the first seat 314(1) in the event of a collision. In some instances, the first legs 320 may be of different thicknesses and/or shapes in comparison to one another as well.

Second legs 322 may similarly extend between the second seat 314(2) and the floorboard 116. The second legs 322 may be similar to, or different than, the first legs 320. Additionally, although shown as including four legs, the first legs 320 and/or the second legs 322 may include more than, or less than, four legs.

FIGS. 4A-4D illustrate various graphs showing a movement of a seat 400 during a collision, based on a various lengths and/or orientations of legs coupled to the seat 400. In FIGS. 4A-4D, a first leg 402 and a second leg 404 are shown coupled to the bottom of the seat 400. Additionally, an energy absorber 406 is shown coupled to a back of the seat 400. In some instances, the seat 400 depicted in FIGS. 4A-4D may be representative of the seat 106 discussed above with regard to FIGS. 3A and 3B. However, it is to be understood that FIGS. 4A-4D are merely illustrative of the movement of the seat 400 by adjusting the length and/or orientation of the first leg 402, the second leg 404, and/or other legs of the seat 400. In such instances, more than two legs or less than two legs may couple to the seat 400 and the energy absorber 406 may couple to the seat 400 at different locations and/or directions than shown. For this reason, the examples shown in FIGS. 4A-4D are merely illustrative.

Additionally, as shown in FIGS. 4A-4D, the seat 400, the first leg 402, the second leg 404, and the energy absorber 406 are shown in solid lines and dashed lines. The solid lines may represent the position of the seat 400, the first leg 402, the second leg 404, and the energy absorber 406 prior to a collision, whereas the dashed lines may represent the seat 400, the first leg 402, the second leg 404, and the energy absorber 406 subsequent to a collision. Additionally, the graphs shown in FIGS. 4A-4D illustrate the respective movements of portions of the seat 400 during a collision (with the first leg 402, the second leg 404, and the energy absorber 406) in horizontal and vertical directions.

Figure 4A:
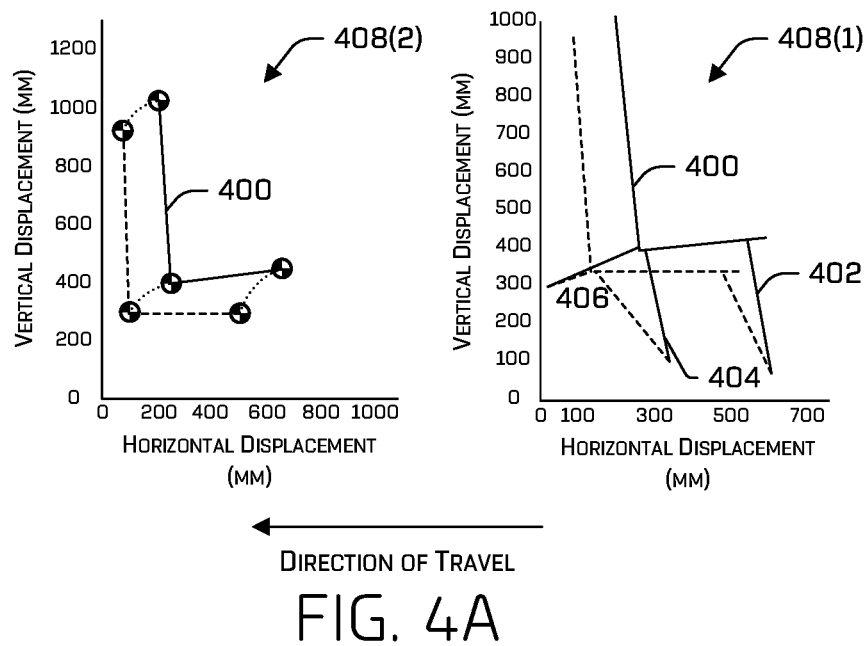
FIGS. 4A-4D illustrate various graphs showing a movement of a seat, or portions thereof, in the event of a collision of a vehicle, according to an example of the present disclosure.

In FIG. 4A, a first graph 408(1) is shown where the first leg 402 and the second leg 404 are slanted in a direction rearwards (from a front of the seat 400 towards a back of the seat 400). As additionally shown, the first leg 402 may be longer than the second leg 404. Following, or during, the collision the seat 400 translates backward and downward via the compression of the energy absorber 406 and the buckling of the first leg 402 and the second leg 404. In FIG. 4A, a second graph 408(2) is shown that illustrates the seat 400 remaining relatively horizontal following the collision. Additionally, the second graph 408(2) illustrates that a front, a back, and a top of the seat 400 may move in the horizontal and vertical directions by substantially the same amount.

Figure 4B:
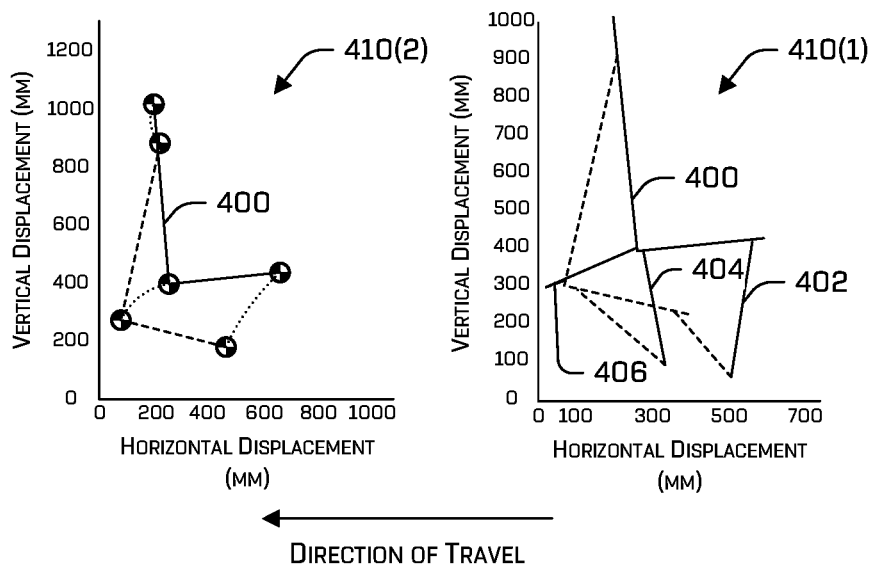

In FIG. 4B, a first graph 410(1) is shown where the first leg 402 is slanted forward and the second leg 404 is slanted rearward. As additionally shown, the first leg 402 may be longer than the second leg 404. Following, or during, the collision the seat 400 translates backward and downward via the compression of the energy absorber 406 and the buckling of the first leg 402 and the second leg 404. In FIG. 4B, a second graph 410(2) is shown that illustrates the seat 400 being slanted downward following the collision. The second graph 410(2) further illustrates that the front and the back of the seat 106 may translate in both vertical and horizontal directions, whereas the top of the seat may substantially translate in the vertical direction.

Figure 4C:
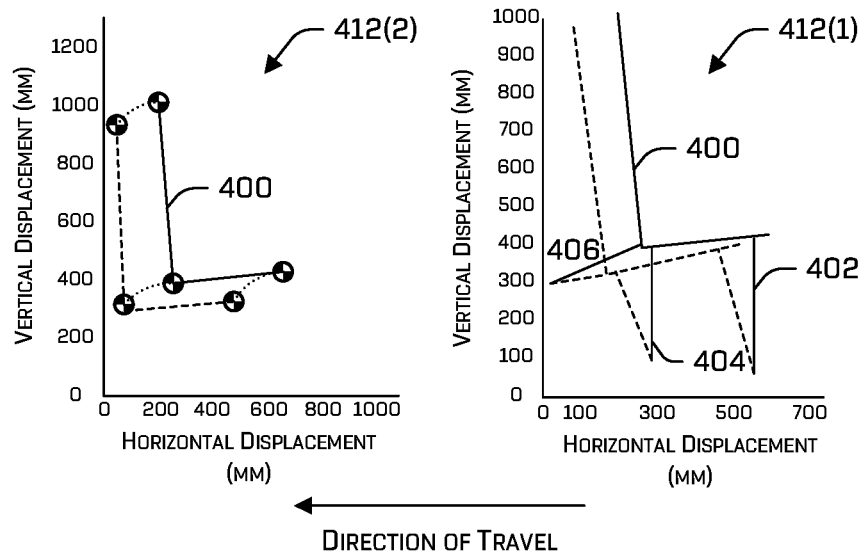

In FIG. 4C, a first graph 412(1) is shown where the first leg 402 and the second leg 404 are oriented substantially vertically (e.g., orthogonal). As additionally shown, the first leg 402 may be longer than the second leg 404. Following, or during, the collision the seat 400 translates backward and downward via the compression of the energy absorber 406 and the buckling of the first leg 402 and the second leg 404. In FIG. 4C, a second graph 412(2) is shown that illustrates the seat 400 remaining slanted backward following the collision. Additionally, the second graph 412(2) illustrates that a front, a back, and a top of the seat 400 move by substantially the same amount in both the horizontal and vertical directions.

Figure 4D:
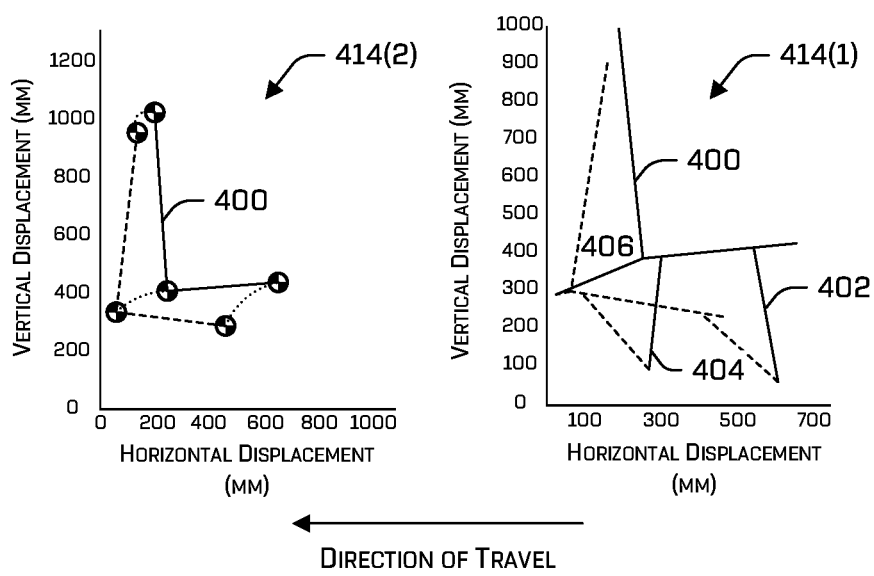

In FIG. 4D, a first graph 414(1) is shown where the first leg 402 is oriented rearwards and the second leg 404 is oriented forward. As additionally shown, the first leg 402 may be longer than the second leg 404. Following, or during, the collision the seat 400 translates backward and downward via the compression of the energy absorber 406 and the buckling of the first leg 402 and the second leg 404. In FIG. 4D, a second graph 414(2) is shown that illustrates the seat 400 being slanted downward following the collision. Additionally, the second graph 414(2) illustrates that a front, a back, and a top of the seat 400 move in both the horizontal and vertical directions.

As such, in FIGS. 4A-4D, the length and/or orientation of the first leg 402, the second leg 404, and/or other leg(s) of the seat 400 may be altered for modifying a movement of the seat 400 during a collision. In such instances, by altering the length and/or orientation, the travel path of the occupant may be adjusted during compression. This may be used to locate the occupant in a safer position during a collision, as well as counteract unwanted displacements imparted to the first leg 402, the second leg 404, and/or other leg(s) during a collision. In some instances, a stiffness of the energy absorber 406, or other energy absorbers (both location and stiffness) may impact the travel path of the seat 400. Further, as introduced above, a gap may be interposed between the seat 400 and the body structure 114 to accommodate for the movement of the seat 400. In some instances, however, the seat 400 may contact portion of the body structure 114, which in turn, may assist in absorbing some of the forces associated with a collision.

Figure 5:
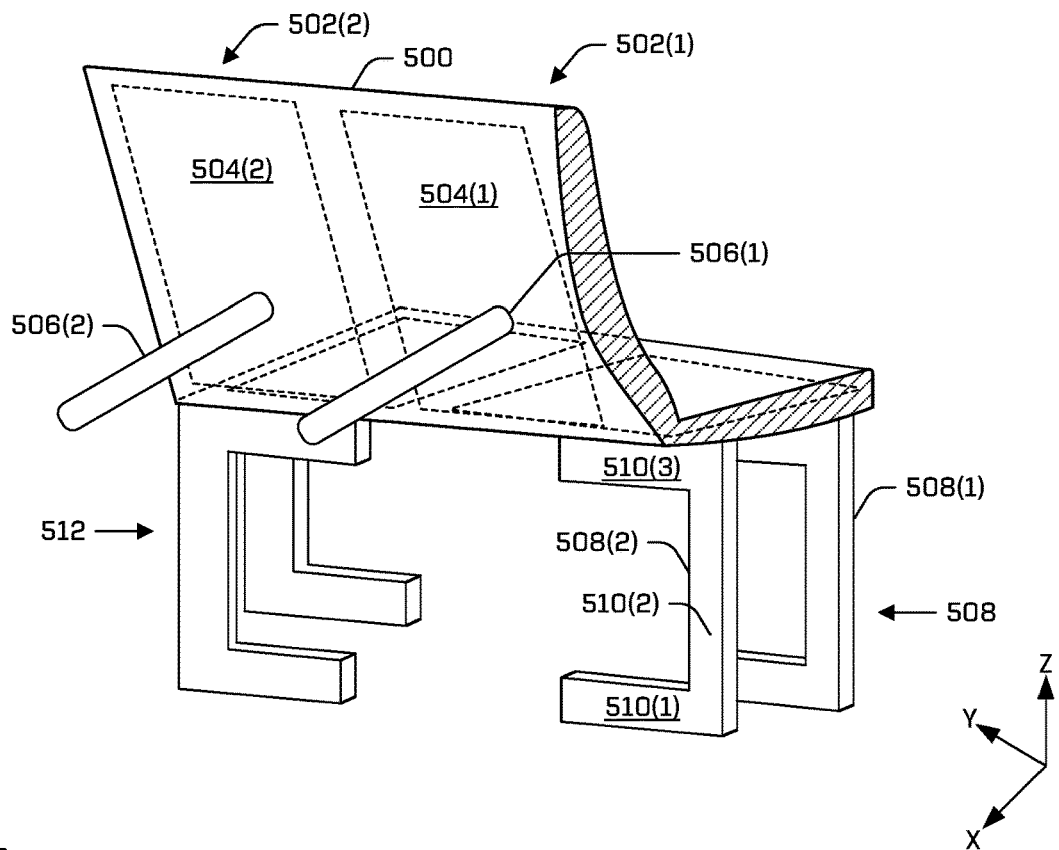
FIG. 5 illustrates example energy absorbers coupled to example seats of a vehicle, according to an example of the present disclosure.

FIG. 5 illustrates a seating structure 500 that may be similar to the seating structure 312 as discussed above with regard to FIG. 3B. For example, the seating structure 500 may be configured to seat multiple occupants, where a first occupant sits within a first seat 502(1) and a second occupant sits within a second seat 502(2). Each of the first seat 502(1) and the second seat 502(2) may be similar to, or represent, the seat 106. For example, the first seat 502(1) may include a first seat frame 504(1) and the second seat 502(2) may include a second seat frame 504(2). The first seat frame 504(1) and/or the second seat frame 504(2) may be disposed along the back and/or bottom of the first seat 502(1) and the second seat 502(2), respectively. However, the first seat 502(1) and the second seat 502(2) may visually appear to be a single, bench-style, seat (e.g., via a cover).

Additionally, a first energy absorber 506(1) is shown coupled to the back of the first seat 502(1) (or the first seat frame 504(1)) and a second energy absorber 506(2) is shown coupled to the back of the second seat 502(2) (or the second seat frame 504(2)). The first energy absorber 506(1) and the second energy absorber 506(2) may be similar to the energy absorber 302, and couple to the second frame 110 (not shown in FIG. 5). In some instances, the first energy absorber 506(1) and the second energy absorber 506(2) may be disposed proximate a bottom of the seating structure 500, or a bottom/lower portion of the first seat 502(1) and the second seat 502(2), respectively.

First legs 508 are shown coupled to the bottom of the first seat 502(1). As shown, the first legs 508 may include two legs, such as leg 508(1) and leg 508(2). The leg 508(1) and the leg 508(2) may be spaced apart in the X-direction. The first legs 508 may extend between the first seat 502(1) and the floorboard 116 (not shown in FIG. 5). As shown, the first legs 508 may be differently shaped than the first legs 320 as discussed above with regard to FIGS. 3A and 3B. For example, the first legs 508 are shown being "C-shaped." In this sense, a first portion 510(1) of the first legs 508 may horizontally extend across the floorboard 116 (Y-direction), a second portion 510(2) may vertically extend from the first portion 510(1) (Z-direction), and a third portion 510(3) may horizontally extend from the second portion 510(2) (Z-direction). Accordingly, the third portion 510(3) may be disposed over the first portion 510(1) such that the first legs 508 resemble the "C-shape."

In some instances, the first portion 510(1) and the third portion 510(3) may be substantially the same horizontal size (Y-direction). The first portion 510(1) and the third portion 510(3) may couple to the floorboard 116 and the first seat frame 504(1) at multiple positions, respectively. Moreover, the first portion 510(1) and the third portion 510(3) may fixedly or hingedly coupled to the floorboard 116 and the first seat frame 504(1), respectively. Additionally, or alternatively, the first legs 508 may be oriented at different angles than shown (e.g., slanted forward in the X-direction or slated rearward in the X-direction).

Second legs 512 may similarly extend between the second seat 502(2) and the floorboard 116. The second legs 512 may be similar to, or different than, the first legs 508. Additionally, although shown as including two legs, the first legs 508 and/or the second legs 512 may include more than, or less than, two legs.

The seating structure 500 as shown in FIG. 5 may permit additional storage under the first seat 502(1) and the second seat 502(2), as compared to the seating structure 500. For example, luggage, bags, and so forth may be placed beneath the seating structure 500.

Figure 6:
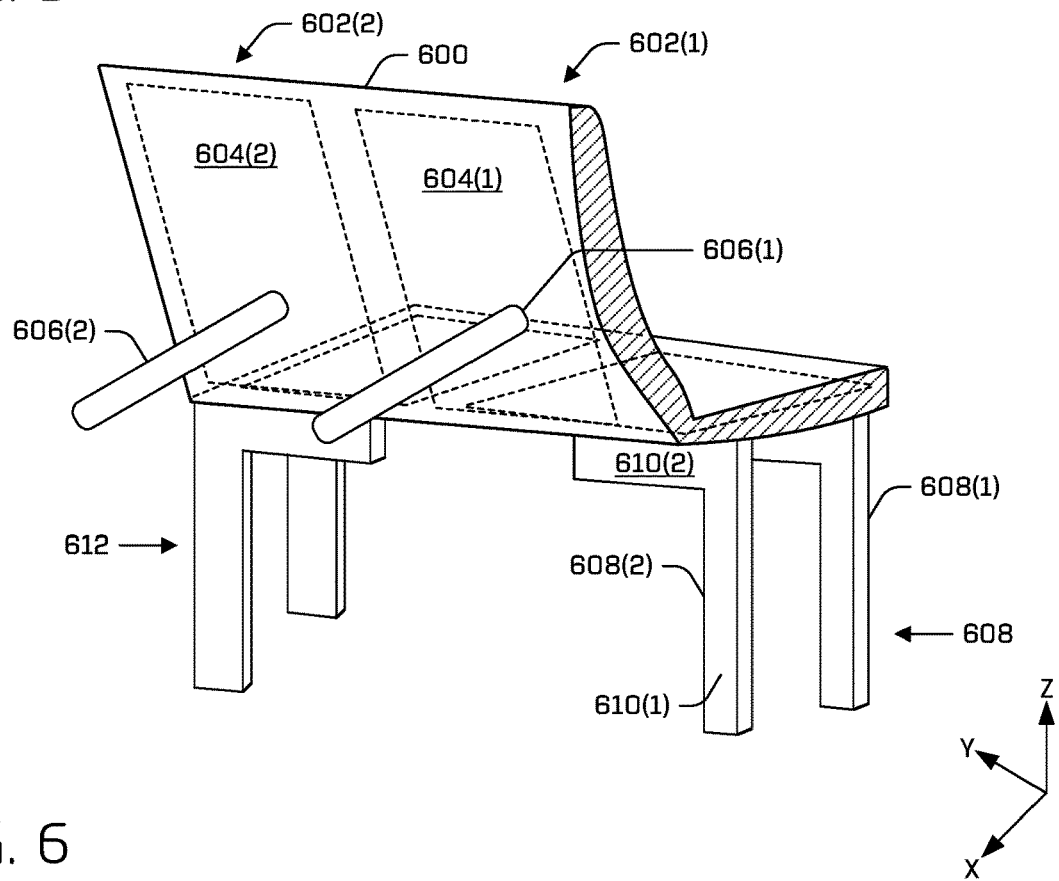
FIG. 6 illustrates example energy absorbers coupled to example seats of a vehicle, according to an example of the present disclosure.

FIG. 6 illustrates a seating structure 600 that may be similar to the seating structure 312 as discussed above with regard to FIGS. 3A and 3B, and/or the seating structure 500 discussed above with regard to FIG. 5. For example, the seating structure 600 may be configured to seat multiple occupants, where a first occupant sits within a first seat 602(1) and a second occupant sits within a second seat 602(2). Each of the first seat 602(1) and the second seat 602(2) may be similar to, or represent, the seat 106. For example, the first seat 602(1) may include a first seat frame 604(1) and the second seat 602(2) may include a second seat frame 604(2). The first seat frame 604(1) and/or the second seat frame 604(2) may be disposed along the back and/or bottom of the first seat 602(1) and the second seat 602(2), respectively. However, the first seat 602(1) and the second seat 602(2) may visually appear to be a single, bench-style, seat (e.g., cover).

Additionally, a first energy absorber 606(1) is shown coupled to the back of the first seat 602(1) (or the first seat frame 604(1)) and a second energy absorber 606(2) is shown coupled to the back of the second seat 602(2) (or the second seat frame 604(2)). The first energy absorber 606(1) and the second energy absorber 606(2) may be similar to the energy absorber 302, and couple to the second frame 110 (not shown in FIG. 6). In some instances, the first energy absorber 606(1) and the second energy absorber 606(2) may be disposed proximate a bottom of the seating structure 600, or a bottom/lower portion of the first seat 602(1) and the second seat 602(2), respectively.

First legs 608 are shown coupled to the bottom of the first seat 602(1). As shown, the first legs 608 may include two legs, such as a leg 608(1) and a leg 608(2). The leg 608(1) and the leg 608(2) may be spaced apart in the X-direction. The first legs 608 may extend between the first seat 602(1) and the floorboard 116 (not shown in FIG. 6). As shown, the first legs 608 may be differently shaped than the first legs 320 as discussed above with regard to FIGS. 3A and 3B, as well as the first legs 508 discussed above with regard to FIG. 5. For example, the first legs 608 are shown being "L-shaped." In this sense, a first portion 610(1) of the first legs 608 vertically extends from the floorboard 116 (Z-direction) and a second portion 610(2) may horizontally extend from the first portion 610(1) (Z-direction). The first portion 610(1) and the second portion 610(2) may couple to the floorboard 116 and the first seat frame 604(1) at multiple positions, respectively. Moreover, the first portion 610(1) and the second portion 610(2) may fixedly or hingedly couple to the floorboard 116 and the first seat frame 604(1), respectively. Additionally, or alternatively, the first legs 608 may be oriented at different angles than shown.

Second legs 612 may similarly extend between the second seat 602(2) and the floorboard 116. The second legs 612 may be similar to, or different than, the first legs 608. Additionally, although shown as including two legs, the first legs 608 and/or the second legs 612 may include more than, or less than, two legs.

The seating structure 600 may permit additional storage underheat the first seat 602(1) and the second seat 602(2), as compared to the seating structure 600. For example, luggage, bags, and so forth may be placed beneath the seating structure 600.

Figure 7A:
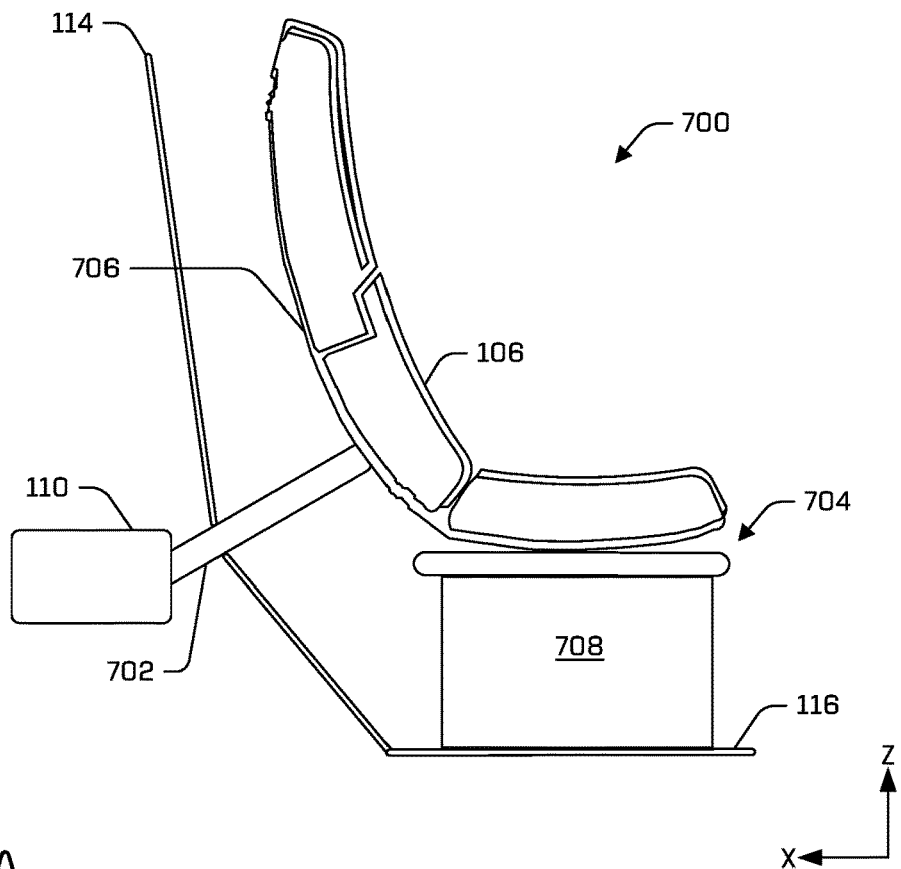
FIG. 7A illustrates a first view of example energy absorbers coupled to an example seat of a vehicle, according to an example of the present disclosure.

FIG. 7A illustrates an example safety structure 700 for absorbing forces associated with a collision. In some instances, the safety structure 700 may include the body structure 114, the second frame 110, an energy absorber 702, and slides 704. The energy absorber 702 may couple to a back (seatback) of the seat 106, or a frame 706 of the seat 106, and the second frame 110. The slides 704 are shown coupled to bottom of the seat 106, or the frame 706 of the seat 106, and the body structure 114 via a seat support 708. In some instances, the seat support 708 may couple to the floorboard 116 or other structures of the vehicle, to remain stationary during a collision.

The energy absorber 702 may represent a damper (e.g., pneumatic, hydraulic, etc.) that absorbs forces experienced by the seat 106 in the event of a collision. For example, the energy absorber 702 may compress horizontally and/or vertically to lessen accelerations experienced by an occupant in the seat 106. In some instances, the energy absorber 702 may extend through the body structure 114 for coupling to the second frame 110. As also shown, the seat 106 may be spaced away from the body structure 114 to allow the seat 106 to translate (via the compression of the energy absorber 702) in the event of a collision. The energy absorber 702 may be disposed at various angles to result in minimal forces being experienced by the occupant (as discussed above).

The slides 704 may represent linear actuators that displace the seat 106 in the event of a collision. For example, the seat 106 may couple to the slides 704, such that in the event on a collision, the seat 106 may translate rearward (X-direction). That is, the slides 704 may permit the seat to have a degree of translational movement, or a degree of travel, in the event of a collision. Meanwhile, the seat support 708 may remain stationary as the slides 704 translate. In some instances, the slides 704 may be configured to translate after experience a threshold amount of force, and after the energy absorber deforms. For example, after overcoming the threshold amount of force, the energy absorber 702 may compress and the slides 704 may actuate. In some instances, the threshold amount of force may be approximately between 3000 pounds and 4000 pounds. The threshold amount of force, in some instances, may be based at least in part on a mass of the seat 106, a mass of the occupant, and/or an orientation of the energy absorber 702.

In some instances, the slides 704 may be disposed at various angles relative to a horizontal plane or axis to result in minimal forces being experienced by the occupant. Moreover, in some instances, the energy absorber 702 may be integrated within the slides 704 and/or the seat 106.

Figure 7B:
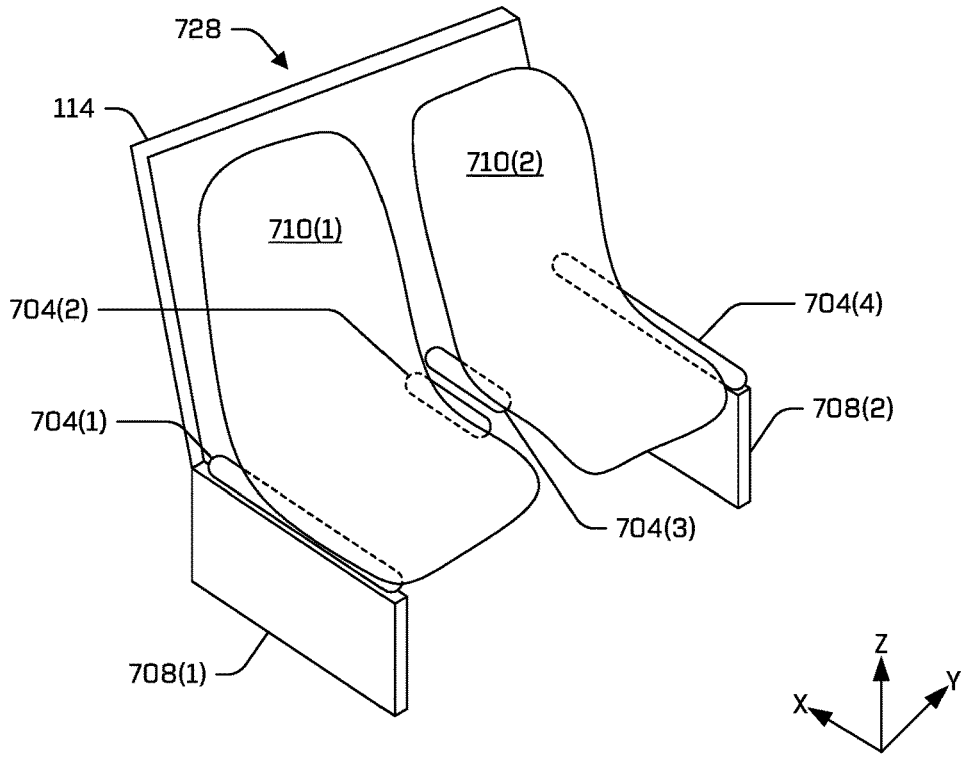
FIG. 7B illustrates a second view of the energy absorbers of FIG. 7A coupled to seats, according to an example of the present disclosure.

FIG. 7B illustrates multiple seats of a seating structure 728, where a first occupant may sit within a first seat 710(1) and a second occupant may sit within a second seat 710(2). Each of the first seat 710(1) and the second seat 710(2) may be similar to, or represent, the seat 106. For example, the first seat 710(1) may include a first seat frame and the second seat 710(2) may include a second seat frame. The first seat frame and/or the second seat frame may be disposed along the back and/or bottom of the first seat 710(1) and the second seat 710(2), respectively.

Multiple slides 704 may couple to each of the first seat 710(1) and/or the second seat 710(2). For example, a first slide 704(1) and a second slide 704(2) may couple to the first seat 710(1), and a third slide 704(3) and a fourth slide 704(4) may couple to the second seat 710(2). The first slide 704(1), the second slide 704(2), the third slide 704(3), and the fourth slide 704(4) may represent linear slides that are configured to translate in the X-direction in the event of a collision and after overcoming forces required to compress one or more energy absorber(s). For example, the coupling of the first slide 704(1) and the second slide 704(2) to the first seat 710(1) may displace the first seat 710(1) in the event of a collision to reduce accelerations experienced by an occupant of the first seat 710(1). Similarly, the coupling of the third slide 704(3) and the fourth slide 704(4) to the second seat 710(2) may displace the second seat 710(2) in the event of a collision. In this sense, the first seat 710(1) and the second seat 710(2) may independently translate.

In conjunction with the energy absorbers coupled to the back of the first seat 710(1) and the second seat 710(2), respectively, the first seat 710(1) and the second seat 710(2) may limit forces experienced by the occupants. For example, the energy absorbers coupled to the back of the first seat 710(1) and the second seat 710(2), respectively, may include dampers that dampen the movement of the first seat 710(1) and the second seat 710(2). That is, when the first slide 704(1) and the second slide 704(2) translate, the energy absorber 702 coupled to the back of the first seat 710(1) may reduce accelerations. Similarly, when the third slide 704(3) and the fourth slide 704(4) translate, the energy absorber 702 coupled to the back of the second seat 710(2) may reduce accelerations.

As shown, the slides 704 may couple to sides of the first seat 710(1) and the second seat 710(2). For example, the first slide 704(1) may couple to a first side (outer side) of the first seat 710(1) and the second slide 704(2) may couple to a second side (inner side) of the first seat 710(1), spaced apart in the Y-direction. The third slide 704(3) may couple to a first side (inner side) of the second seat 710(2) and the fourth slide 704(4) may couple to a second side (outer side) of the second seat 710(2), spaced apart in the Y-direction. Additionally, the first slide 704(1) may couple to a first seat support 708(1) and the fourth slide 704(4) may couple to a second seat support 708(2). The first seat support 708(1) and the second seat support 708(2). Discussed later, the second slide 704(2) and the third slide 704(3) may similarly couple to seat supports.

In some instances, the slides 704 may be differently sized than one another. For example, the first slide 704(1) and the fourth slide 704(4) may include a longer length than the second slide 704(2) and the third slide 704(3), respectively. That is, the first slide 704(1) and the fourth slide 704(4) may be longer (X-direction) than the second slide 704(2) and the third slide 704(3). In some instances, the first slide 704(1) and the fourth slide 704(4) may be longer to support a weight of an occupant in the first seat 710(1) and the second seat 710(2), respectively. The longer length of the first slide 704(1) and the fourth slide 704(4) may also provide stability to the first seat 710(1) and the second seat 710(2). However, although shown as being different in length, the first slide 704(1) and the second slide 704(2) may translate by the same amount. Additionally, the third slide 704(3) and the fourth slide 704(4) may translate by the same amount.

In some instances, instead of including two slides 704 coupled to each of the first seat 710(1) and the second seat 710(2), more than two slides or less than two slides may couple to the first seat 710(1) and/or the second seat 710(2). For example, one slide may be disposed in the center (Y-direction) of the first seat 710(1) and/or the second seat 710(2).

Figure 7C:
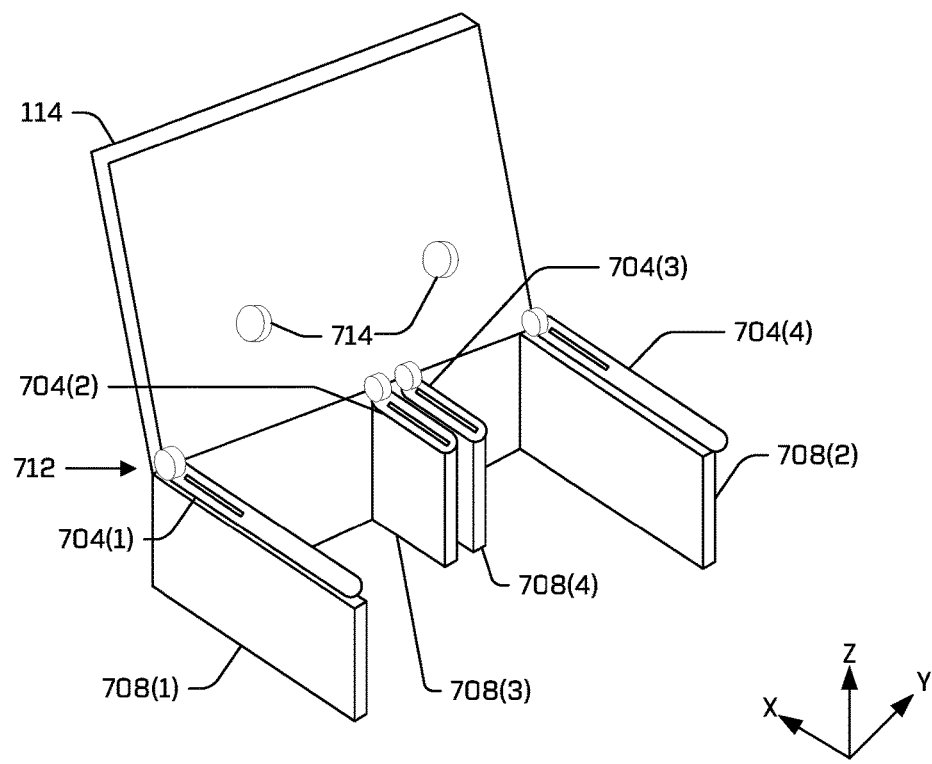
FIG. 7C illustrates a third view of the energy absorbers of FIG. 7A, according to an example of the present disclosure.

FIG. 7C illustrates the slides 704. The first seat 710(1) and the second seat 710(2) are shown removed to better illustrate a coupling of the slides 704 to seat supports. The first slide 704(1) is shown coupled to the first seat support 708(1) and the fourth slide 704(4) is shown coupled to the second seat support 708(2). Additionally, the second slide 704(2) may couple to a third seat support 708(3) and the third slide 704(3) may couple to a fourth seat support 708(4). In some instances, the third seat support 708(3) and the fourth seat support 708(4) may be integrated into a single seat support disposed between the first seat 710(1) and the second seat 710(2). The seat supports may couple to the floorboard 116 to couple the slides 704 to the vehicle 100 to allow the first seat 710(1) and the second seat 710(2) to translate. However, the seat supports may couple to other portions of the vehicle, such as sidewalls, shrouds, etc. on lateral sides of the first seat 710(1) and/or second seat 710(2).

The slides 704 are shown including channels that extend along at least a portion of a longitudinal length of the slides 704 (X-direction). In some instances, the channels of the slides 704 may be of similar length such that the first seat 710(1) translates within the first slide 704(1) and the second slide 704(2), and the second seat 710(2) translates within the third slide 704(3) and the fourth slide 704(4), by substantially equal amounts. Additional details of the channels are discussed herein with regard to FIG. 7D.

Hinges 712 are shown to permit the first seat 710(1) and the second seat 710(2) to be folded upwards (e.g., about the Y-axis). In some instances, the first seat 710(1) and the second seat 710(2) may include two of the hinges 712. The hinges 712 may also couple to the seat supports 708, respectively. In some instances, the hinges 712 may adjoin a back of the first seat 710(1) (or a back frame of the first seat 710(1)) and a bottom of the first seat 710(1) (or a bottom frame of the first seat 710(1)). Additionally, the hinges 712 may adjoin a back of the second seat 710(2) (or a back frame of the second seat 710(2)) and a bottom of the second seat 710(2) (or a bottom frame of the second seat 710(2)). In such instances, the energy absorber(s) may couple to a back of the first seat 710(1) and the second seat 710(2), whereas the slides 704 may couple to a bottom of the first seat 710(1) and the second seat 710(2). The hinges 712 may therefore allow the first seat 710(1) and the second seat 710(2) to be folded. For example, folding the first seat 710(1) and/or the second seat 710(2) may provide access to a storage area under the first seat 710(1) and the second seat 710(2).

The body structure 114 is may include openings 714 through which the energy absorbers 702 may extend for coupling to the first seat 710(1) and the second seat 710(2). Although the seat supports 708 are shown extending from the body structure 114, the seat supports 708 may extend from other portions of the vehicle 100. For example, the seat supports 708 may extend from the body structure, behind the first seat 710(1) and the second seat 710(2) (X-direction), and/or from lateral sides of the first seat 710(1) and the second seat 710(2) (Y-direction). In such instances, the slides 704 may be coupled to other portions of the body structure 114, or other frames, subframes, members, etc. of the vehicle 100. Moreover, as discussed above, the energy absorber(s) may be integrated within the slides 704 coupled the bottom of the first seat 710(1) and the second seat 710(2). Further, in some instances, the first seat 710(1) and/or the second seat 710(2) may include more than, or less than, two slides 704.

Figure 7D:
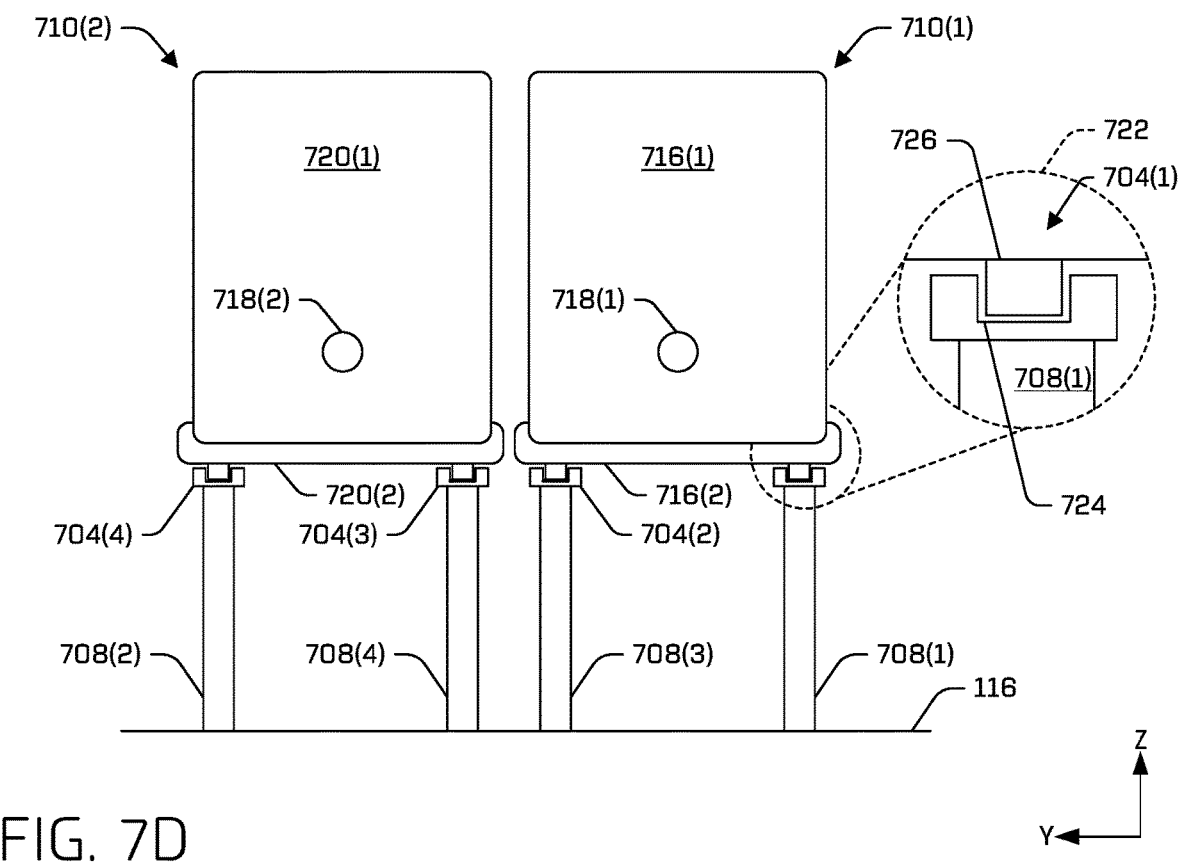
FIG. 7D illustrates a fourth view of the energy absorbers of FIG. 7A coupled to seats, according to an example of the present disclosure.

FIG. 7D illustrates a detailed view of the first seat 710(1), the second seat 710(2), and the slides 704. The slides 704 are shown being coupled to the seat supports 708.

The first seat 710(1) includes a first portion 716(1) and a second portion 716(2). The first portion 716(1) may represent a seatback of the first seat 710(1), and the second portion 716(2) may represent a base of the first seat 710(1). The first portion 716(1) may couple to a first energy absorber 718(1), and the second portion 716(2) may couple to the first slide 704(1) and the third slide 704(3). The first portion 716(1) and the second portion 716(2) may couple via the hinges 712, as discussed above with FIG. 8C. As such, the first seat 710(1) may be folded to access a storage area under the first seat 710(1).

In some instances, one or more collapsible members may couple the first portion 716(1) and the second portion 716(2) together. For example, a fabric strap may couple the first portion 716(1) and the second portion 716(2), along a side of the first seat 710(1). In such instances, the one or more members may assist in supporting a weight of an occupant on the first seat 710(1).

The second seat 710(2) may similarly include a first portion 720(1) and a second portion 720(2). The first portion 720(1) may represent a seatback of the second seat 710(2), and the second portion 720(2) may represent a base of the second seat 710(2). The first portion 720(1) may couple to a second energy absorber 718(2), and the second portion 720(2) may couple to the second slide 704(2) and the fourth slide 704(4).

A detailed view 722 illustrates the first slide 704(1). However, although discussed with regard to the first slide 704(1), the first slide 704(1) may be representative of the second slide 704(2), the third slide 704(3), and/or the fourth slide 704(4). The first slide 704(1) is shown including a channel 724 that couples to the first seat support 708(1). The channel 724 is sized to receive a projection 726, which may couple to and/or extend from second portion 716(2) of the first seat 710(1). The projection 726 is configured to slide within the channel 724 (X-direction) during a collision, and after forces associated with compressing the first energy absorber 718(1) are overcome. The channel 724 is further shown including sidewalls, which may direct a movement of the projection within the channel 724 during a collision. During a folding of the first seat 710(1), the projection 726 may be disposed external to the channel 724.

Although shown as including particular features, the slides 704 may include other female and/or male connectors that permit sliding of the first seat 710(1), and/or a folding of the first seat 710(1). For example, the projection 726 may include flanges that engage with interior sidewalls, or slots, of the channel 724. In such instances, the projection 726 may disengage with the first seat 710(1) for allowing the first seat 710(1) to be folded, thereby keeping the projection 726 within the channel 724. Disengagement may come by way of a pin that couples the projection 726 to the first seat 710(1). Moreover, in some instances, the channel 724 may couple to the second portion 716(2) and the projection 726 may extend from the first seat support 708(1) (or other portions of the vehicle 100).

Figure 8A:
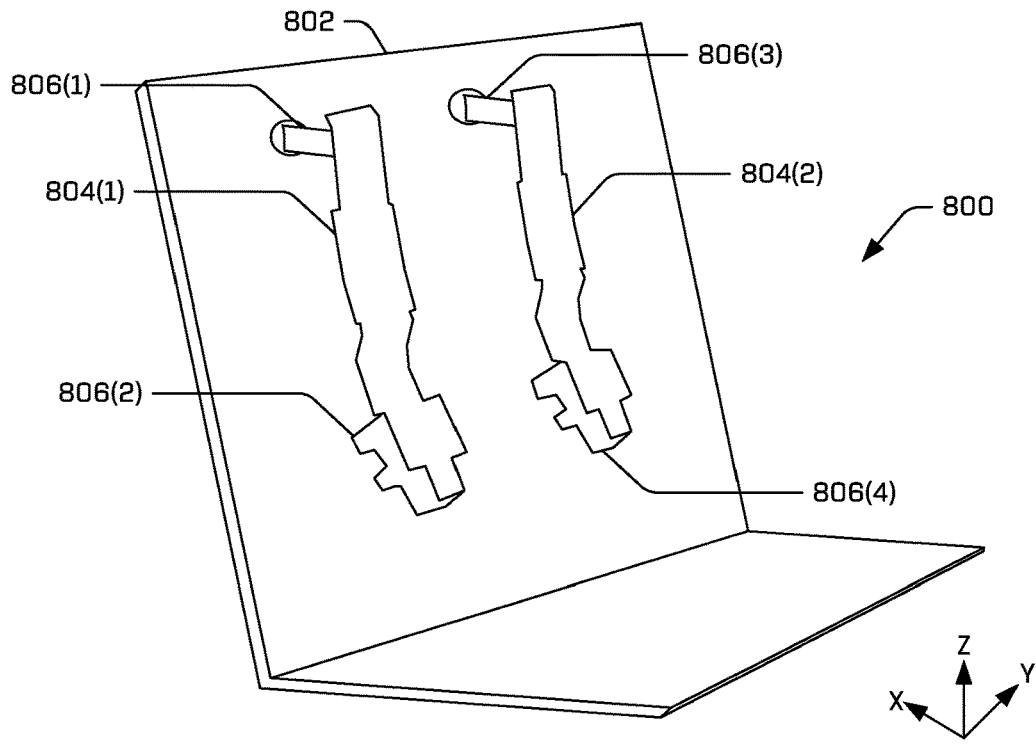
FIG. 8A illustrates a first view of example energy absorbers of a vehicle, according to an example of the present disclosure.
Figure 8B:
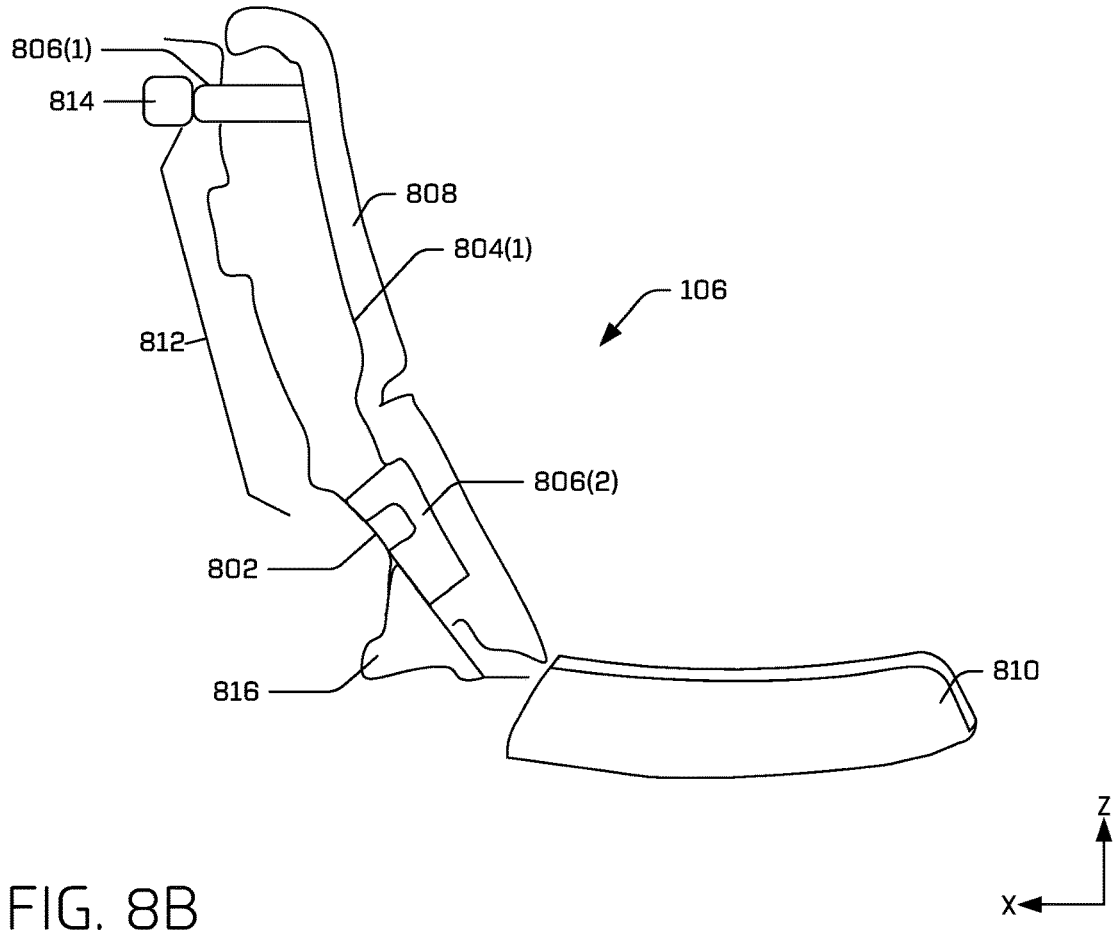
FIG. 8B illustrates a second view of the energy absorbers of FIG. 8A coupled to a seat, according to an example of the present disclosure.

FIGS. 8A and 8B illustrates a safety structure 800 that includes energy absorbers and loadplates coupled to seats of a vehicle. The safety structure 800 may include a body structure 802, which may be similar to the body structure 114 as discussed above with regard to FIGS. 1-7D.

Loadplates 804, such as a first loadplate 804(1) and a second loadplate 804(2), may couple to energy absorbers. For example, the first loadplate 804(1) may include a first end (top) and a second end (bottom) spaced apart from the first end (Z-direction). The second loadplate 804(2) may similarly include a first end and a second end. The first loadplate 804(1) and the second loadplate 804(2) may couple to a first seat and a second seat of the vehicle, respectively. In some instances, the first loadplate 804(1) and the second loadplate 804(2) may include a rigid material (e.g., composite, metal, etc.) for transferring forces to the energy absorbers.

The first loadplate 804(1) may couple to a first energy absorber 806(1) and a second energy absorber 806(2). The first energy absorber 806(1) is shown coupling proximal to the first end of the first loadplate 804(1), and the second energy absorber 806(2) is shown coupling proximal to the second end of the first loadplate 804(1). Between the first energy absorber 806(1) and the second energy absorber 806(2), the first loadplate 804(1) may be unsupported and spaced apart (X-direction) from the body structure. In such instances, the first energy absorber 806(1) and the second energy absorber 806(2) may couple to a back of the first loadplate 804(1), whereas the seat 106 may couple to a front of the first loadplate 804(1).

Additionally, the second loadplate 804(2) may couple to a third energy absorber 806(3) and a fourth energy absorber 806(4). The third energy absorber 806(3) is shown coupling proximal to the first end of the second loadplate 804(2), and the fourth energy absorber 806(4) is shown coupling proximal to the second end of the second loadplate 804(2). Between the third energy absorber 806(3) and the fourth energy absorber 806(4), the second loadplate 804(2) may be unsupported and spaced apart (X-direction) from the body structure 802. The third energy absorber 806(3) and the fourth energy absorber 806(4) may couple to a back of the second loadplate 804(2), whereas a seat may couple to a front of the second loadplate 804(2).

In some instances, the first energy absorber 806(1) and the third energy absorber 806(3) may include a crush-can type structure, a pneumatic cylinder, or a hydraulic cylinder that compress in the event of a collision. In instances where the first energy absorber 806(1) and the third energy absorber 806(3) includes a crush-can type structure, such structures may crush axially (X-direction) as a result forces experienced by the first loadplate 804(1) and the second loadplate 804(2) being imparted. In some examples, the crush-can type structure may include cells that collapse upon being subjected to a compressive force above a certain threshold (e.g., 3000 pounds). As such, the first energy absorber 806(1) and the third energy absorber 806(3) absorbs the energy of the impact by collapsing and deforming. The design of the first energy absorber 806(1) and the third energy absorber 806(3) including its size, materials, cell structure, shape, and angle are selected to maximize the energy absorbed during compression (distance it takes for the vehicle 100 to come to rest after impact) in order to minimize the force applied to occupants and to protect both vehicle components and the occupants.

Ends of the first energy absorber 806(1) and the third energy absorber 806(3) not coupled to the first loadplate 804(1) and the second loadplate 804(2), respectively, may couple to a structural member or frame of the vehicle (e.g., the first frame 108) for dissipating forces experienced during a collision. Openings in the body structure 802 permit the first energy absorber 806(1) and the third energy absorber 806(3) to couple to the frame. In some instances, the first energy absorber 806(1) and the third energy absorber 806(3) may have a travel length that is approximately between 50 millimeters and 200 millimeters.

In some instances, the second energy absorber 806(2) and the fourth energy absorber 806(4) may include an energy absorbing material that plastically deforms under a compressive force, which may arise from an acceleration of an occupant's back relative to and against the first loadplate 804(1) and the second loadplate 804(2) during a collision, respectively. The energy absorbing material may be disposed between the first loadplate 804(1) and the second loadplate 804(2), and the body structure 802, respectively. In some instances, the energy absorbing material may be disposed throughout all or a portion of an area between the first loadplate 804(1) and the second loadplate 804(2), and the body structure 802.

In some instances, the energy absorbing material may be any of a number of types of polymeric foams (expanded polypropylene (EPP) foam, urethane foam, polystyrene foam, etc.), plastic, aluminum, corrugated cardboard or other material, or a combination thereof. Such materials may be formed in a honeycomb or other structure. Cells of the energy absorber material may form a variety of shapes including a square, rectangle, triangle, hexagon, octagon, or trapezoid.

Generally, the energy absorbing material may contribute to the safeness of the seat 106 by absorbing kinetic energy via compression and inelastic deformation. For example, before a collision (e.g., a collision against a part of the vehicle behind the seat 106), the occupant will have zero velocity with respect to the seat 106. Subsequent to a collision, however, the occupant will accelerate relative to and toward the seat 106 (or seatback), leading to a rearward force proportional to the acceleration. The rearward force causes the occupant (e.g., substantially the torso of the occupant) to push against the first loadplate 804(1) and the second loadplate 804(2) with a force that inelastically compresses energy absorbing material. If such compression were not inelastic, as for a different material, moments after the collision the different material would recoil (e.g., expand) forward and possibly place injurious forces on the occupant. Thus, energy absorbing material allows for dissipation of forces without such recoil. Depending on the material, the second energy absorber 806(2) and the fourth energy absorber 806(4) may be made by extrusion, casting, injection molding, three-dimensional printing, machining, combinations of the foregoing, or other manufacturing techniques.

In FIG. 8B, a side view is shown that illustrates the seat 106 coupled to the first loadplate 804(1). However, although the discussion herein is with regard to the seat 106 coupling to the first loadplate 804(1), a seat may similarly couple to the second loadplate 804(2). The seat 106 may include a first portion 808 that couples to the first loadplate 804(1), which may represent a seatback of the seat 106, and a second portion 810, which may represent a base of the seat 106. In some instances, the first portion 808 and the second portion may be independent of one another, or may be coupled (e.g., fixedly, pivotably, etc.). In some instances, the second portion 810 may include additional energy absorbers, or may be configured to translate with a movement of the first portion 808 in the event of a collision (e.g., via a fixed coupling).

In some instances, the first loadplate 804(1) may be sized smaller than dimensions of the seat 106. For example, the first loadplate 804(1) may include a width (Y-direction) that is smaller than a width of the seat 106, and/or may include a length (Z-direction) that is smaller than a length of the seat 106. In some instances, the first loadplate 804(1) may be centered on the seat 106 in one or more direction (Y-direction and/or Z-direction). Moreover, as the first loadplate 804(1) is configured to transfer energy to the first energy absorber 806(1) and/or the second energy absorber 806(2), the first loadplate 804(1) may include a cross-sectional area (in a direction perpendicular to a surface of the seat 106) that is greater than a first cross sectional area of the first energy absorber 806(1) and a second cross sectional area of the second energy absorber 806(2), respectively. That is, where the first energy absorber 806(1) and/or the second energy absorber 806(2) couple to the first loadplate 804(1), the first loadplate 804(1) may include a cross-sectional area that is sized larger than a first cross-sectional area of an end of the first energy absorber 806(1) coupled to the first loadplate 804(1) and an end of the second energy absorber 806(2) coupled to the second loadplate 804(1), respectively.

The first energy absorber 806(1) is shown coupled proximate to the first end (e.g., top) of the first loadplate 804(1). The first energy absorber 806(1) may extend through the body structure 802 for coupling to a frame 814, or other structure, of the vehicle 100. In some instances, the frame 814 may be representative of the first frame 108. In other examples, the first energy absorber 806(1) may couple to the body structure 802 and forces experienced by the first energy absorber 806(1) may be transferred to the body structure 802. In turn, the body structure 802 may disperse energy via a coupling to frames of the vehicle and/or deforming. The body structure 802 may include flanges, plates, or receptacles for receiving the first energy absorber 806(1).

The second energy absorber 806(2) is shown disposed proximate to the second end (e.g., bottom) of the first loadplate 804(2). The second energy absorber 806(2) may be disposed between the first loadplate 804(1) and the body structure 802, and/or frames of the vehicle 100. For example, the second energy absorber 806(2) may be at least partially disposed between the first loadplate 804(1) and a frame 816. The frame 816 may be representative of the second frame 110. The second energy absorber 806(2) may couple to the first loadplate 804(1) and/or the body structure 802.

In some instances, the first energy absorber 806(1) and the second energy absorber 806(2) may couple to the first loadplate 804(1) at respective angles. For example, the first energy absorber 806(1) may be oriented substantially horizontal, whereas the second energy absorber 806(2) may be oriented upwards (relative to the X-axis in the Z-direction, or about the Y-axis). Such orientation may be based at least in part on the shape and/or features of the body structure 802 and/or the first loadplate 804(1).

The first loadplate 804(1) may include an unsupported section 812, between the first energy absorber 806(1) and the second energy absorber 806(2). During collision, the unsupported section 812 may displace or deform (X-direction). In this sense, the seat 106 may have different stiffnesses tailored for different parts of the back of the occupant, such as the pelvic region, the lumbar region, the thoracic region, and/or the cervical region.

Figure 9:
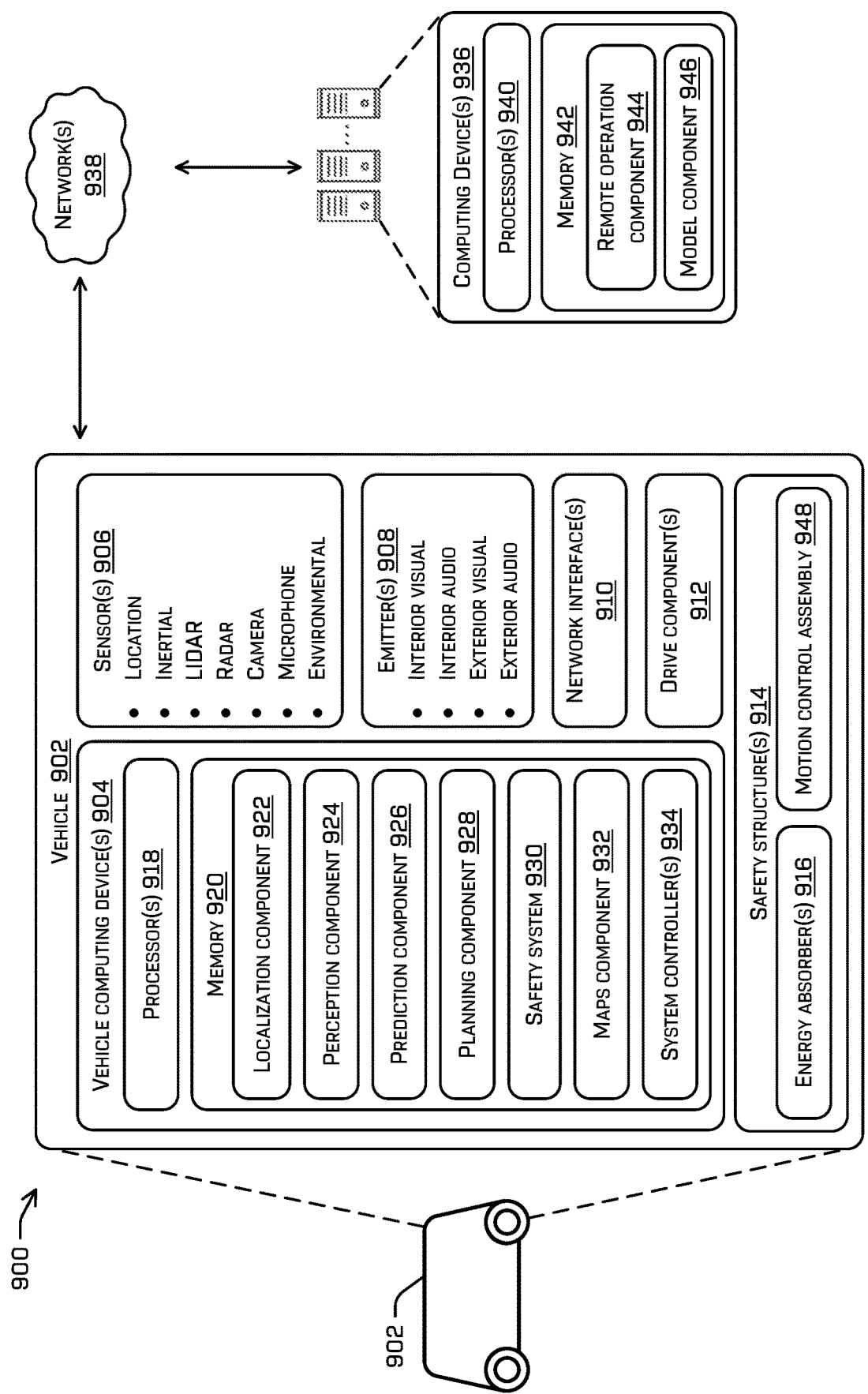
FIG. 9 is a block diagram of an example system architecture for implementing the example techniques described herein, according to an example of the present disclosure.

FIG. 9 depicts a block diagram of an example architecture 900 for implementing the techniques discussed herein. In some instances, the example architecture 900 may include a vehicle 902, which may represent the vehicle 100 in FIG. 1. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well.

The vehicle 902 may include one or more vehicle computing device(s) 904, one or more sensor(s) 906, one or more emitter(s) 908, one or more network interface(s) 910 (also referred to as communication devices and/or modems), one or more drive component(s) 912, and/or one or more safety structures 914. In some instances, the one or more sensor(s) 906 may include time-of-flight sensors, location sensors (e.g., GPS, compass, etc.), inertial sensors (e.g., inertial measurement units (IMUs, accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 906 may include multiple instances of each of these or other types of sensors. For instance, the time-of-flight sensors may include individual time-of-flight sensors located at the corners, front, back, sides, and/or top of the vehicle 902. As another example, the camera sensors may include multiple cameras disposed at various locations about the exterior and/or interior of the vehicle 902. The one or more sensor(s) 906 may provide input to the vehicle computing device(s) 904.

The one or more emitter(s) 908 may emit light and/or sound. The one or more emitter(s) 908 in this example may include interior audio and visual emitters to communicate with passengers of the vehicle 902. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 908 in this example may also include exterior emitters. By way of example and not limitation, the exterior emitters in this example may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 may also include one or more network interface(s) 910 that enable communication between the vehicle 902 and one or more other local or remote computing device(s) (e.g., a remote teleoperation computing device) or remote services. For instance, the one or more network interface(s) 910 may facilitate communication with other local computing device(s) on the vehicle 902. Also, the one or more network interface(s) 910 may allow the vehicle 902 to communicate with other nearby computing device(s) (e.g., other nearby vehicles, traffic signals, etc.). The one or more network interface(s) 910 may include physical and/or logical interfaces for connecting the vehicle computing device(s) 904 to another computing device or one or more external networks (e.g., the Internet). For example, the one or more network interface(s) 910 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 902 may include one or more drive component(s) 912. In some examples, the vehicle 902 may have a single drive component 912. In at least one example, the vehicle 902 may have multiple drive components 912, where individual drive components 912 may be positioned on opposite ends of the vehicle 902 (e.g., the front and the rear, etc.). In at least one example, the drive component(s) 912 may include the one or more sensor(s) 906 to detect conditions of the drive component(s) 912 and/or the surroundings of the vehicle 902. By way of example and not limitation, the sensor(s) 906 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive component(s) 912. In some cases, the sensor(s) 906 on the drive component(s) 912 may overlap or supplement corresponding systems of the vehicle 902 (e.g., sensor(s) 906).

The drive component(s) 912 may include many vehicle systems, including a high voltage battery, a motor to propel the vehicle 902, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Additionally, the drive component(s) 912 may include a drive manager component. In some instances, the drive manager component may receive and preprocess data from the sensor(s) 906 and to control operation of the various system(s) and/or component(s) of the vehicle 902. In some examples, the drive manager component may include one or more processor(s) and memory communicatively coupled with the one or more processor(s). The memory may store one or more components to perform various functionalities of the drive component(s) 912. Furthermore, the drive component(s) 912 also include one or more communication connection(s) that enable communication by the respective drive system with one or more other local or remote computing device(s).

The safety structure(s) 914 may include seat(s) within which occupants of the vehicle 902 sit. The safety structure(s) 914, in addition to include frames, supports, etc. of the vehicle 902, may include energy absorber(s) 916 and/or a motion control assembly 948 (e.g., linear slides, legs, etc.). The energy absorber(s) 916 and/or the motion control assembly 948 may couple the seat(s) to various portions of the vehicle 902, such as the frames, for absorbing and dissipating forces associated with a collision. In some instances, the energy absorber(s) 916 may include dampers (e.g., pneumatic, hydraulic, etc.), physical structure(s) (e.g., crush tubes, foam, etc.), actuators, etc., while the motion control assembly 948 may include arms, legs, slides, and so forth. In some instances, any number of the energy absorber(s) 916 may couple to the seat and the motion control assembly 948 may include any number of legs, slides, etc. coupled to the seat. In some instances, the energy absorber(s) 916 and/or the motion control assembly 948 may be configured to compress, deform, buckle, translate, rotate, etc. upon experiencing a threshold amount of force (e.g., 3000 pounds). In some instances, the energy absorber(s) 916 and/or the motion control assembly 948 may also have a degree of travel during a collision to dissipate forces associated with the collision.

As shown, the vehicle computing device(s) 904 may include one or more processor(s) 918 and memory 920 communicatively coupled with the one or more processor(s) 918. In the illustrated example, the memory 920 of the vehicle computing device(s) 904 stores a localization component 922, a perception component 924, a prediction component 926, a planning component 928, a safety system 930, a maps component 932, and one or more system controller(s) 934. Though depicted as residing in the memory 920 for illustrative purposes, it is contemplated that the localization component 922, the perception component 924, the prediction component 926, the planning component 928, the safety system 930, the maps component 932, and the one or more system controller(s) 934 may additionally, or alternatively, be accessible to the vehicle computing device(s) 904 (e.g., stored in a different component of vehicle 902) and/or be accessible to the vehicle 902 (e.g., stored remotely).

In the memory 920 of the vehicle computing device(s) 904, the localization component 922 may include functionality to receive data from the sensor(s) 906 to determine a position of the vehicle 902. For example, the localization component 922 may include and/or request/receive a three-dimensional map of an environment and may continuously determine a location of the vehicle 902 within the map. In some instances, the localization component 922 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the vehicle 902. In some instances, the localization component 922 may provide data to various components of the vehicle 902 to determine an initial position of vehicle 902 for generating a trajectory, as discussed herein.

The perception component 924 may include functionality to perform object detection, segmentation, and/or classification. In some examples, the perception component 924 may provide processed sensor data that indicates a presence of an entity that is proximate to the vehicle 902 and/or a classification of the entity as an entity type (e.g., car, pedestrian, cyclist, building, tree, road surface, curb, sidewalk, unknown, etc.). In some instances, the perception component 924 may include functionality to store perception data generated by the perception component 924. In some instances, the perception component 924 may determine a track corresponding to an object that has been classified as an object type. The stored perception data may, in some examples, include fused perception data captured by the vehicle 902. Fused perception data may include a fusion or other combination of sensor data from the sensor(s) 906, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 924 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 924 may use perception algorithms to determine a perception based bounding box associated with an object in the environment based on sensor data. For example, the perception component 924 may receive image data from the one or more sensor(s) 906 and classify the image data to determine that an object is represented in the image data. Then, using detection algorithms, the perception component 924 may generate a two dimensional bounding box and/or a perception based three dimensional bounding box associated with the object. The perception component 924 may further generate a three dimensional bounding box associated with the object. The three dimensional bounding box may provide additional information such as a location, orientation, pose, and/or size (e.g., size, width, height, etc.) associated with the object.

The prediction component 926 may generate one or more probability maps representing prediction probabilities of possible locations of one or more objects in an environment. For example, the prediction component 926 may generate one or more probability maps for vehicles, pedestrians, animals, and the like within a threshold distance from the vehicle 902. In some instances, the prediction component 926 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 928 may determine a path for the vehicle 902 to follow to traverse through an environment. For example, the planning component 928 may determine various routes and paths and various levels of detail. In some instances, the planning component 928 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 928 may generate an instruction for guiding the vehicle 902 along at least a portion of the route from the first location to the second location. In at least one example, the planning component 928 may determine how to guide the vehicle 902 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 928 may alternatively, or additionally, use data from the perception component 924 and/or the prediction component 926 to determine a path for the vehicle 902 to follow to traverse through an environment. For example, the planning component 928 may receive data from the perception component 924 and/or the prediction component 926 regarding objects associated with an environment. Using this data, the planning component 928 may determine a route to travel from a first location (e.g., a current location) to a second location (e.g., a target location) to avoid objects in an environment. In at least some examples, such a planning component 928 may determine there is no such collision free path and, in turn, provide a path which brings vehicle 902 to a safe stop avoiding all collisions and/or otherwise mitigating damage.

In examples, the safety system 930 in addition to or in place of the planning component 928 may alternatively, or additionally, use data from the perception component 924, the one or more sensor(s) 906, and/or the localization component 922, to determine whether a path for the vehicle 902 through an environment will require a sudden change in velocity, a hard stop, or if a collision is unavoidable. For example, safety system 930 may receive data from the perception component 924, the one or more sensor(s) 906, and/or the localization component 922, regarding objects associated with an environment. Using this data, the safety system 930 may determine a required change in velocity of the vehicle, a predicted change in velocity of the vehicle, a collision, or a predicted collision.

In examples, planning component 928 and/or safety system 930 may determine an impact location between the vehicle 902 and the object based at least in part on trajectories of the vehicle 902 and/or the object. For example, planning component 928 and/or safety system 930 may determine that the intersection between the vehicle 902 and the object is on a side, front, rear, etc. of the vehicle 902. In some instances, planning component 928 and/or safety system 930 may determine whether the vehicle 902 includes rearward facing occupant(s) and/or forward facing occupant(s) within the vehicle 902, using the trajectory of the vehicle 902 and/or the sensor(s) 906.

In some instances, planning component 928 and/or safety system 930 may be configured to determine a time associated with change in velocity of the vehicle, a predicted change in velocity of the vehicle, a collision, or a predicted collision, or whether the change in velocity of the vehicle, a predicted change in velocity of the vehicle, a collision, or a predicted collision is imminent. The time may be a particular time, such as, for example, 120 milliseconds after 3:05 pm, or it may be a time interval from a time in which change in velocity of the vehicle, a predicted change in velocity of the vehicle, a collision, or a predicted collision was determined. The time may be determined based on a measured closure rate of the object toward the vehicle 902, a velocity of the vehicle 902, an acceleration of the vehicle 902, a velocity of the object, an acceleration of the object, road conditions, weather conditions, and/or other factors that may affect a closure rate of the object toward the vehicle 902, or vice versa.

The memory 920 may further include one or more map component(s) 932 that may be used by the vehicle 902 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps component 932 may include at least one map (e.g., images and/or a mesh). In some examples, the vehicle 902 may be controlled based at least in part on the maps component 932. That is, the maps component 932 may be used in connection with the localization component 922, the perception component 924 (and sub-components), the prediction component 926, and/or the planning component 928 to determine a location of the vehicle 902, identify objects in an environment, generate prediction probability(ies) associated with objects and/or the vehicle 902, and/or generate routes and/or trajectories to navigate within an environment.

In at least one example, the vehicle computing device(s) 904 may include one or more system controller(s) 934, which may be configured to control steering, propulsion, braking, safety, emitters, communication, and other systems of the vehicle 902. These system controller(s) 934 may communicate with and/or control corresponding systems of the drive component(s) 912 and/or other components of the vehicle 902, which may be configured to operate in accordance with a path provided from the planning component 928.

The vehicle 902 may connect to computing device(s) 936 via a network 938 and may include one or more processor(s) 940 and memory 942 communicatively coupled with the one or more processor(s) 940. In at least one instance, the one or more processor(s) 940 may be similar to the processor(s) 918, and the memory 942 may be similar to the memory 920. In the illustrated example, the memory 942 of the computing device(s) 936 stores a remote operation component 944 and/or a model component 946. In at least one instance, the model component 946, after empirical testing and/or simulations, may generate ML models to be used by the perception component 924, as discussed herein. Though depicted as residing in the memory 942 for illustrative purposes, it is contemplated that the remote operation component 944 and the model component 946 may additionally, or alternatively, be accessible to the computing device(s) 936 (e.g., stored in a different component of computing device(s) 936 and/or be accessible to the computing device(s) 936 (e.g., stored remotely).

The processor(s) 918 of the vehicle computing device(s) 904 and/or the processor(s) 940 of the computing device(s) 936 may be any suitable processor capable of executing instructions to process data and perform operations as described herein. By way of example and not limitation, the processor(s) 918 and 940 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 920 of the vehicle computing device(s) 904 and/or the memory 942 of the computing device(s) 936 are examples of non-transitory computer-readable media. The memory 920 and 942 may store an operating system and one or more software applications, instructions, programs, and/or data to implement the methods described herein and the functions attributed to the various systems. In various implementations, the memory 920 and 942 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 920 and 942 may be implemented as a neural network.

As described herein, an exemplary neural network is an algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

EXAMPLE CLAUSES

The following paragraphs describe various examples. Any of the examples in this section may be used with any other of the examples in this section and/or any of the other examples or embodiments described herein.

A: A vehicle comprising: a first longitudinal end, a second longitudinal end opposite the first longitudinal end, a first lateral side, and a second lateral side opposite the first lateral side; a passenger compartment positioned between the first longitudinal end and the second longitudinal end, the passenger compartment including a seat proximate the first longitudinal end and distal the second longitudinal end and the seat facing toward the second longitudinal end; a first structural support disposed between the first longitudinal end and the seat, the first structural support extending between the first lateral side and the second lateral side; a second structural support disposed vertically beneath the seat; an energy absorber disposed between the seat and the first structural support and configured to deform to absorb energy of a collision on the first longitudinal end; and a motion control assembly coupled to the seat and the second structural support, the motion control assembly being configured to control motion of the seat to at least one of translate or rotate during the collision.

B: The vehicle of paragraph A, wherein the motion control assembly is configured to translate and rotate during the collision.

C: The vehicle of paragraph A or B, wherein: the seat comprises a seatback and a base; the energy absorber is coupled to the seatback and the first structural support; and the motion control assembly is coupled to the base and the second structural support.

D: The vehicle of any of paragraphs A-C, wherein: the energy absorber comprises at least one of: a crush-structure, a hydraulic damper, or a pneumatic damper; the motion control assembly comprises: a first deformable leg, a second deformable leg, a third deformable leg, and a fourth deformable leg.

E: The vehicle of any of paragraphs A-D, wherein the motion control assembly comprises: a first linear slide coupled to a first side of the seat; and a second linear slide coupled to a second side of the seat, opposite the first side.

F: A safety structure for a vehicle comprising: a first structural support of the vehicle; a second structural support of the vehicle; an energy absorber coupled to a seatback of a seat of the vehicle and the first structural support, the energy absorber being configured to deform during a collision to absorb energy; and a motion control assembly coupled to the seat and the second structural support of the vehicle, the motion control assembly being configured to control motion of the seat to at least one of translate or rotate during the collision.

G: The safety structure of paragraph F, wherein: the second structural support is disposed below the seat; and the motion control assembly comprises: a first leg, the first leg having a first end coupled proximate to a front of a base of the seat and a second end coupled to the second structural support; and a second leg, the second leg having a third end coupled proximate a back of the base of the seat and a fourth end coupled to the second structural support.

H: The safety structure of paragraph F or G, wherein at least one of the first leg or the second leg is configured to deform, buckle, or crumple to absorb energy during the collision.

I: The safety structure of any of paragraphs F-H, wherein: the first leg has a first length and couples to the base of the seat at a first angle; and the second leg has a second length and couples to the base of the seat at a second angle, the second length being different than the first length and the second angle being different than the first angle.

J: The safety structure of any of paragraphs F-I, wherein: the first leg pivotably or fixedly couples to the base of the seat; the first leg pivotably or fixedly couples to the second structural support; the second leg pivotably or fixedly couples to the base of the seat; and the second leg pivotably or fixedly couples to the second structural support.

K: The safety structure of any of paragraphs F-J, wherein: the motion control assembly comprises: a first linear slide coupled to a first side of the seat; and a second linear slide coupled to a second side of the seat, opposite the first side; and during the collision the first linear slide and the second linear slide are configured to translate to cause the energy absorber to deform to absorb energy.

L: The safety structure of any of paragraphs F-K, wherein: the first linear slide comprises a first length and a first travel length; and the second linear slide comprises a second length and a second travel length, the second length being different than the first length, the second travel length being the same as the first travel length.

M: The safety structure of any of paragraphs F-L, wherein the energy absorber comprises at least one of: a crush-structure, a hydraulic damper, or a pneumatic damper.

N: The safety structure of any of paragraphs F-M, wherein the energy absorber couples to at least one of: the seatback proximate a base of the seat; or the base proximate the seatback.

O: The safety structure of any of paragraphs F-N, wherein: the energy absorber includes a central longitudinal axis; the first structural support includes a lateral axis; and the energy absorber is disposed at an angle between approximately zero degrees and thirty degrees relative to the lateral axis.

P: A safety structure comprising: a seat including a base and a seatback; a motion control assembly coupled to the base of the seat, the motion control assembly being configured to translate during a collision; and an energy absorber including a first end configured couple to the seatback proximate the base, and a second end configured to couple to a structural support of a vehicle, the energy absorber being configured to deform during the collision to absorb energy and based at least in part on the translation of the motion control assembly.

Q: The safety structure of paragraph P, wherein: the motion control assembly comprises a first leg and a second leg; the first leg is configured to be disposed between the base of the seat and a second structural support of the vehicle; and the second leg is configured to be disposed between the base of the seat and the second structural support of the vehicle.

R: The safety structure of paragraph P or Q, wherein the motion control assembly comprises a first linear slide and a second linear slide coupled to the base of the seat.

S: The safety structure of any of paragraphs P-R, wherein the energy absorber is configured to translate in multiple directions to absorb the energy during the collision.

T: The safety structure of any of paragraphs P-S, wherein the motion control assembly is further configured to rotate during the collision.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A vehicle comprising:
    a first longitudinal end, a second longitudinal end opposite the first longitudinal end, a first lateral side, and a second lateral side opposite the first lateral side;
    a passenger compartment positioned between the first longitudinal end and the second longitudinal end, the passenger compartment including:
        a floorboard, and
        a seat disposed above the floorboard proximate to the first longitudinal end and distal the second longitudinal end, the seat facing toward the second longitudinal end;
    a first structural support disposed between the first longitudinal end and the seat, the first structural support extending between the first lateral side and the second lateral side;
    a second structural support disposed between the seat and the floorboard;
    a motion control assembly coupled to the seat and the second structural support, the motion control assembly being configured to move to control motion of the seat during a collision at the first longitudinal end; and
    an energy absorber disposed between the seat and the first structural support, the energy absorber being configured to deform to absorb energy of the collision and based at least in part on movement of the motion control assembly.

2. The vehicle of claim 1, wherein the motion control assembly is configured to translate and rotate during the collision.

3. The vehicle of claim 1, wherein:
    the seat comprises a seatback and a base;
    the energy absorber is coupled to the seatback and the first structural support; and
    the motion control assembly is coupled to the base and the second structural support.

4. The vehicle of claim 1, wherein:
    the energy absorber comprises at least one of:
        a crush-structure,
        a hydraulic damper, or
        a pneumatic damper; and
    the motion control assembly comprises:
        a first deformable leg,
        a second deformable leg,
        a third deformable leg, and
        a fourth deformable leg.

5. The vehicle of claim 1, wherein the motion control assembly comprises:
    a first linear slide coupled to a first side of the seat; and
    a second linear slide coupled to a second side of the seat, opposite the first side.

6. A safety structure for a vehicle comprising:
    a first structural support of the vehicle;
    a second structural support of the vehicle;
    an energy absorber coupled to the first structural support and at least one of:
        a seatback of a seat of the vehicle proximate a base of the seat, or
        the base of the seat proximate the seatback,
        wherein the energy absorber is configured to deform during a collision to absorb energy; and
    a motion control assembly coupled to the seat and the second structural support of the vehicle, the motion control assembly being configured to control motion of the seat during the collision, wherein the energy absorber deforms based at least in part on the motion control assembly controlling motion of the seat.

7. The safety structure of claim 6, wherein:
    the second structural support is disposed below the seat; and
    the motion control assembly comprises:
        a first leg, the first leg having a first end coupled proximate to a front of the base of the seat and a second end coupled to the second structural support; and
        a second leg, the second leg having a third end coupled proximate a back of the base of the seat and a fourth end coupled to the second structural support.

8. The safety structure of claim 7, wherein at least one of the first leg or the second leg is configured to deform, buckle, or crumple to absorb the energy during the collision.

9. The safety structure of claim 7, wherein:
    the first leg has a first length and couples to the base of the seat at a first angle; and
    the second leg has a second length and couples to the base of the seat at a second angle, the second length being different than the first length and the second angle being different than the first angle.

10. The safety structure of claim 7, wherein:
    the first leg pivotably or fixedly couples to the base of the seat;
    the first leg pivotably or fixedly couples to the second structural support;
    the second leg pivotably or fixedly couples to the base of the seat; and
    the second leg pivotably or fixedly couples to the second structural support.

11. The safety structure of claim 6, wherein:
    the motion control assembly comprises:
        a first linear slide coupled to a first side of the seat; and
        a second linear slide coupled to a second side of the seat, opposite the first side; and
    during the collision the first linear slide and the second linear slide are configured to translate to cause the energy absorber to deform to absorb the energy.

12. The safety structure of claim 11, wherein:
    the first linear slide comprises a first length and a first travel length; and
    the second linear slide comprises a second length and a second travel length, the second length being different than the first length, the second travel length being the same as the first travel length.

13. The safety structure of claim 6, wherein the energy absorber comprises at least one of:
a crush-structure,
a hydraulic damper, or
a pneumatic damper.

14. The safety structure of claim 6, wherein:
the energy absorber includes a central longitudinal axis;
the first structural support includes a lateral axis; and
the energy absorber is disposed at an angle between approximately zero degrees and thirty degrees relative to the lateral axis.

15. A safety structure comprising:
a seat including a base and a seatback;
a motion control assembly coupled to the base of the seat, the motion control assembly being configured to translate during a collision; and
an energy absorber including a first end configured to couple to the seatback proximate the base, and a second end configured to couple to a structural support of a vehicle, the energy absorber being configured to deform during the collision to absorb energy and based at least in part on the translation of the motion control assembly.

16. The safety structure of claim 15, wherein:
the motion control assembly comprises a first leg and a second leg;
the first leg is configured to be disposed between the base of the seat and a second structural support of the vehicle; and
the second leg is configured to be disposed between the base of the seat and the second structural support of the vehicle.

17. The safety structure of claim 15, wherein the motion control assembly comprises a first linear slide and a second linear slide coupled to the base of the seat.

18. The safety structure of claim 15, wherein the energy absorber is configured to translate in multiple directions to absorb the energy during the collision.

19. The safety structure of claim 15, wherein the motion control assembly is further configured to rotate during the collision.

20. The safety structure of claim 6, wherein the energy absorber is configured to deform in multiple directions to absorb the energy during the collision.

* * * * *